United States Patent
Li et al.

(10) Patent No.: US 12,245,277 B2
(45) Date of Patent: Mar. 4, 2025

(54) RESOURCE ALLOCATION FOR UNLICENSED SPECTRUM SIDELINK COMMUNICATIONS

(71) Applicant: QUALCOMM Incorporated, San Diego, CA (US)

(72) Inventors: Qing Li, Princeton Junction, NJ (US); Hong Cheng, Basking Ridge, NJ (US); Junyi Li, Fairless Hills, PA (US); Ozcan Ozturk, San Diego, CA (US); Shuanshuan Wu, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 391 days.

(21) Appl. No.: 17/656,393

(22) Filed: Mar. 24, 2022

(65) Prior Publication Data
US 2023/0319880 A1    Oct. 5, 2023

(51) Int. Cl.
| | |
|---|---|
| *H04W 4/44* | (2018.01) |
| *H04L 1/08* | (2006.01) |
| *H04W 4/46* | (2018.01) |
| *H04W 72/04* | (2023.01) |
| *H04W 72/0446* | (2023.01) |
| *H04W 72/0453* | (2023.01) |
| *H04W 74/00* | (2009.01) |
| *H04W 74/08* | (2009.01) |
| *H04W 74/0816* | (2024.01) |

(52) U.S. Cl.
CPC .......... *H04W 74/0816* (2013.01); *H04L 1/08* (2013.01); *H04W 72/0446* (2013.01); *H04W 72/0453* (2013.01); *H04W 74/002* (2013.01); *H04W 74/0866* (2013.01)

(58) Field of Classification Search
None
See application file for complete search history.

(56) References Cited

U.S. PATENT DOCUMENTS

| | | | |
|---|---|---|---|
| 11,659,551 B2 * | 5/2023 | Cao | H04W 72/02 370/330 |
| 2020/0053704 A1 * | 2/2020 | Kim | H04W 74/006 |
| 2020/0337083 A1 | 10/2020 | Loehr et al. | |

(Continued)

FOREIGN PATENT DOCUMENTS

| | | | |
|---|---|---|---|
| WO | WO-2021237515 A1 | 12/2021 | |
| WO | WO-2021255673 A1 | 12/2021 | |
| WO | WO-2023173282 A1 * | 9/2023 | H04W 28/26 |

OTHER PUBLICATIONS

International Search Report and Written Opinion—PCT/US2023/061262—ISA/EPO—Apr. 12, 2023.

*Primary Examiner* — Duc T Duong
(74) *Attorney, Agent, or Firm* — Harrity & Harrity LLP / Qualcomm

(57) ABSTRACT

Various aspects of the present disclosure generally relate to wireless communication. In some aspects, a first user equipment (UE) may receive, from a network entity, an indication of multiple transmission occasions for a transmission of a sidelink communication in an unlicensed spectrum. The first UE may transmit, to a second UE, the sidelink communication in a selected transmission occasion of the multiple transmission occasions for the transmission of the sidelink communication in the unlicensed spectrum. Numerous other aspects are described.

30 Claims, 14 Drawing Sheets

(56) References Cited

U.S. PATENT DOCUMENTS

| | | |
|---|---|---|
| 2021/0092783 A1 | 3/2021 | Sun et al. |
| 2021/0144750 A1* | 5/2021 | Cao .................... H04W 72/0453 |
| 2021/0306824 A1* | 9/2021 | Li ........................... H04W 4/40 |
| 2021/0336756 A1* | 10/2021 | Chae ..................... H04L 1/1614 |
| 2021/0400704 A1 | 12/2021 | Xue et al. |
| 2022/0030555 A1* | 1/2022 | Chae ................. H04W 72/0446 |
| 2022/0201751 A1 | 6/2022 | Loehr et al. |
| 2023/0007674 A1* | 1/2023 | Si ........................... H04L 5/0048 |
| 2023/0217493 A1* | 7/2023 | Yi ..................... H04W 74/0866 |
| | | 370/329 |
| 2023/0224967 A1* | 7/2023 | Si ..................... H04W 74/0875 |
| | | 370/329 |
| 2023/0371073 A1* | 11/2023 | Liu ...................... H04L 1/1861 |
| 2024/0098782 A1* | 3/2024 | Han ................. H04W 74/0808 |

\* cited by examiner

RESOURCE ALLOCATION FOR UNLICENSED SPECTRUM SIDELINK COMMUNICATIONS

FIELD OF THE DISCLOSURE

Aspects of the present disclosure generally relate to wireless communication and to techniques and apparatuses for resource allocation for unlicensed spectrum sidelink communications.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a first user equipment (UE) for wireless communication. The first UE may include a memory and one or more processors coupled to the memory. The one or more processors may be configured to receive, from a network entity, an indication of multiple transmission occasions for a transmission of a sidelink communication in an unlicensed spectrum. The one or more processors may be configured to transmit, to a second UE, the sidelink communication in a selected transmission occasion of the multiple transmission occasions for the transmission of the sidelink communication in the unlicensed spectrum.

Some aspects described herein relate to a first UE for wireless communication. The first UE may include a memory and one or more processors coupled to the memory. The one or more processors may be configured to receive, from a network entity, an indication of multiple feedback occasions for transmitting sidelink feedback associated with a transmission of a sidelink communication in an unlicensed spectrum. The one or more processors may be configured to receive, from a second UE, the transmission of the sidelink communication. The one or more processors may be configured to transmit, to the second UE in a selected feedback occasion of the multiple feedback occasions, the sidelink feedback associated with the transmission of the sidelink communication in the unlicensed spectrum.

Some aspects described herein relate to a network entity for wireless communication. The network entity may include a memory and one or more processors coupled to the memory. The one or more processors may be configured to transmit an indication of multiple transmission occasions for each of one or more transmissions of a sidelink communication by a UE in an unlicensed spectrum. The one or more processors may be configured to receive feedback associated with the one or more transmissions of the sidelink communication by the UE.

Some aspects described herein relate to a method of wireless communication performed by a first UE. The method may include receiving, from a network entity, an indication of multiple transmission occasions for a transmission of a sidelink communication in an unlicensed spectrum. The method may include transmitting, to a second UE, the sidelink communication in a selected transmission occasion of the multiple transmission occasions for the transmission of the sidelink communication in the unlicensed spectrum.

Some aspects described herein relate to a method of wireless communication performed by a first UE. The method may include receiving, from a network entity, an indication of multiple feedback occasions for transmitting sidelink feedback associated with a transmission of a sidelink communication in an unlicensed spectrum. The method may include receiving, from a second UE, the transmission of the sidelink communication. The method may include transmitting, to the second UE in a selected feedback occasion of the multiple feedback occasions, the sidelink feedback associated with the transmission of the sidelink communication in the unlicensed spectrum.

Some aspects described herein relate to a method of wireless communication performed by a network entity. The method may include transmitting an indication of multiple transmission occasions for each of one or more transmissions of a sidelink communication by a UE in an unlicensed spectrum. The method may include receiving feedback associated with the one or more transmissions of the sidelink communication by the UE.

Some aspects described herein relate to a non-transitory computer-readable medium that stores a set of instructions for wireless communication by a first UE. The set of instructions, when executed by one or more processors of the first UE, may cause the first UE to receive, from a network entity, an indication of multiple transmission occasions for a transmission of a sidelink communication in an unlicensed spectrum. The set of instructions, when executed by one or more processors of the first UE, may cause the first UE to transmit, to a second UE, the sidelink communication in a selected transmission occasion of the multiple transmission occasions for the transmission of the sidelink communication in the unlicensed spectrum.

Some aspects described herein relate to a non-transitory computer-readable medium that stores a set of instructions for wireless communication by a first UE. The set of instructions, when executed by one or more processors of the first UE, may cause the first UE to receive, from a network entity, an indication of multiple feedback occasions for transmitting sidelink feedback associated with a transmission of a sidelink communication in an unlicensed spectrum. The set of instructions, when executed by one or more processors of the first UE, may cause the first UE to receive, from a second UE, the transmission of the sidelink communication. The set of instructions, when executed by one or more processors of the first UE, may cause the first UE to transmit, to the second UE in a selected feedback occasion of the multiple feedback occasions, the sidelink feedback associated with the transmission of the sidelink communication in the unlicensed spectrum.

Some aspects described herein relate to a non-transitory computer-readable medium that stores a set of instructions for wireless communication by a network entity. The set of instructions, when executed by one or more processors of the network entity, may cause the network entity to transmit an indication of multiple transmission occasions for each of one or more transmissions of a sidelink communication by a UE in an unlicensed spectrum. The set of instructions, when executed by one or more processors of the network entity, may cause the network entity to receive feedback associated with the one or more transmissions of the sidelink communication by the UE.

Some aspects described herein relate to an apparatus for wireless communication. The apparatus may include means for receiving, from a network entity, an indication of multiple transmission occasions for a transmission of a sidelink communication in an unlicensed spectrum. The apparatus may include means for transmitting, to a UE, the sidelink communication in a selected transmission occasion of the multiple transmission occasions for the transmission of the sidelink communication in the unlicensed spectrum.

Some aspects described herein relate to an apparatus for wireless communication. The apparatus may include means for receiving, from a network entity, an indication of multiple feedback occasions for transmitting sidelink feedback associated with a transmission of a sidelink communication in an unlicensed spectrum. The apparatus may include means for receiving, from a UE, the transmission of the sidelink communication. The apparatus may include means for transmitting, to the UE in a selected feedback occasion of the multiple feedback occasions, the sidelink feedback associated with the transmission of the sidelink communication in the unlicensed spectrum.

Some aspects described herein relate to an apparatus for wireless communication. The apparatus may include means for transmitting an indication of multiple transmission occasions for each of one or more transmissions of a sidelink communication by a UE in an unlicensed spectrum. The apparatus may include means for receiving feedback associated with the one or more transmissions of the sidelink communication by the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
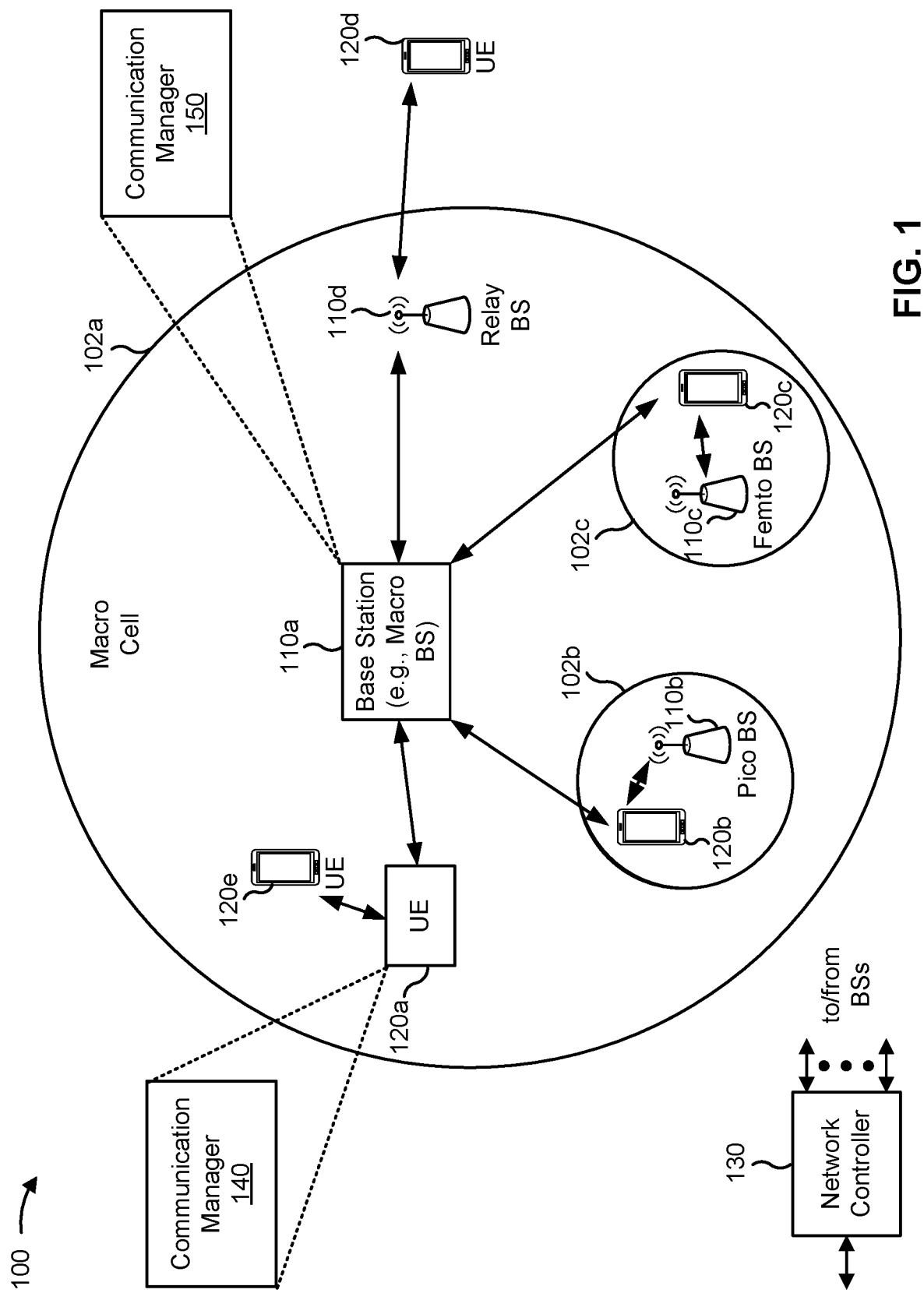
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a ULE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network entity, an indication of multiple transmission occasions for a transmission of a sidelink communication in an unlicensed spectrum; and transmit, to another UE, the sidelink communication in a selected transmission occasion of the multiple transmission occasions for the transmission of the sidelink communication in the unlicensed spectrum. Additionally, or alternatively, the communication manager 140 may perform one or more other operations described herein.

In some aspects, as described in more detail elsewhere herein, the communication manager 140 may receive, from a network entity, an indication of multiple feedback occasions for transmitting sidelink feedback associated with a transmission of a sidelink communication in an unlicensed spectrum; receive, from another other UE, the transmission of the sidelink communication; and transmit, to the other UE in a selected feedback occasion of the multiple feedback occasions, the sidelink feedback associated with the transmission of the sidelink communication in the unlicensed spectrum. Additionally, or alternatively, the communication manager 140 may perform one or more other operations described herein.

In some aspects, a network entity (e.g., a base station 110 or one or more components described in connection with FIG. 3) may include a communication manager 150. As described in more detail elsewhere herein, the communication manager 150 may transmit an indication of multiple transmission occasions for each of one or more transmissions of a sidelink communication by a UE in an unlicensed spectrum; and receive feedback associated with the one or more transmissions of the sidelink communication by the UE. Additionally, or alternatively, the communication manager 150 may perform one or more other operations described herein.

As indicated above, FIG. 1 is provided as an example. Other examples may differ from what is described with regard to FIG. 1.

Figure 2:
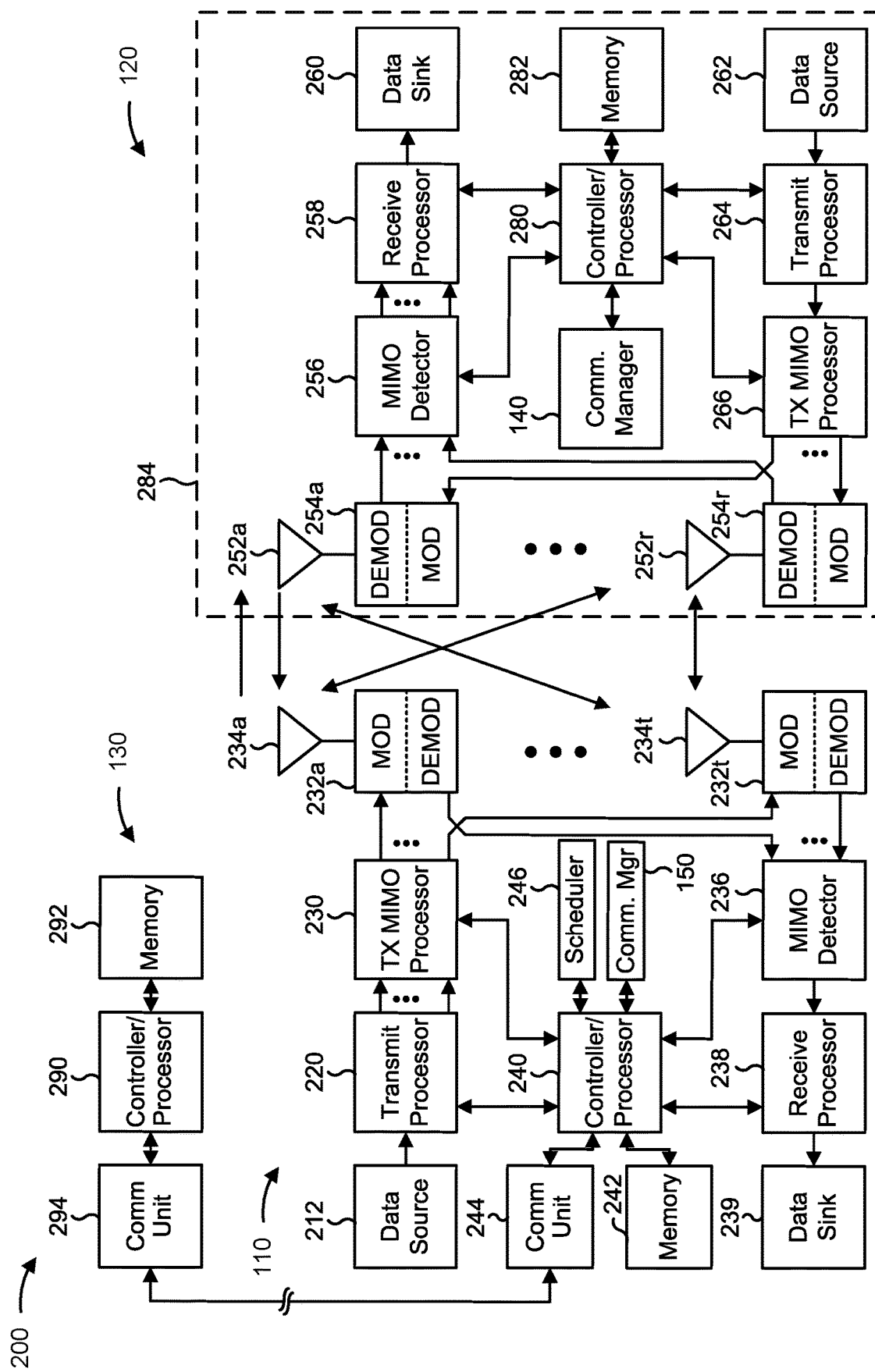
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-14).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-14).

The controller/processor 240 of the base station 110, the controller/processor 280 of the UE 120, and/or any other component(s) of FIG. 2 may perform one or more techniques associated with resource allocation for unlicensed spectrum sidelink communications, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, process 1200 of FIG. 12, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples. In some aspects, a network entity described herein is the base station 110, is included in the base station 110, or includes one or more components of the base station 110 shown in FIG. 2.

In some aspects, the UE 120 includes means for receiving, from a network entity, an indication of multiple transmission occasions for a transmission of a sidelink communication in an unlicensed spectrum; and/or means for transmitting, to a second UE, the sidelink communication in a selected transmission occasion of the multiple transmission occasions for the transmission of the sidelink communication in the unlicensed spectrum. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving, from a network entity, an indication of multiple feedback occasions for transmitting sidelink feedback associated with a transmission of a sidelink communication in an unlicensed spectrum; means for receiving, from a second UE, the transmission of the sidelink communication; and/or means for transmitting, to the second UE in a selected feedback occasion of the multiple feedback occasions, the sidelink feedback associated with the transmission of the sidelink communication in the unlicensed spectrum. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity includes means for transmitting an indication of multiple transmission occasions for each of one or more transmissions of a sidelink communication by a UE in an unlicensed spectrum; and/or means for receiving feedback associated with the one or more transmissions of the sidelink communication by the UE. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units (e.g., a virtual central unit (VCU), a virtual distributed unit (VDU), or a virtual radio unit (VRU)).

Base-station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
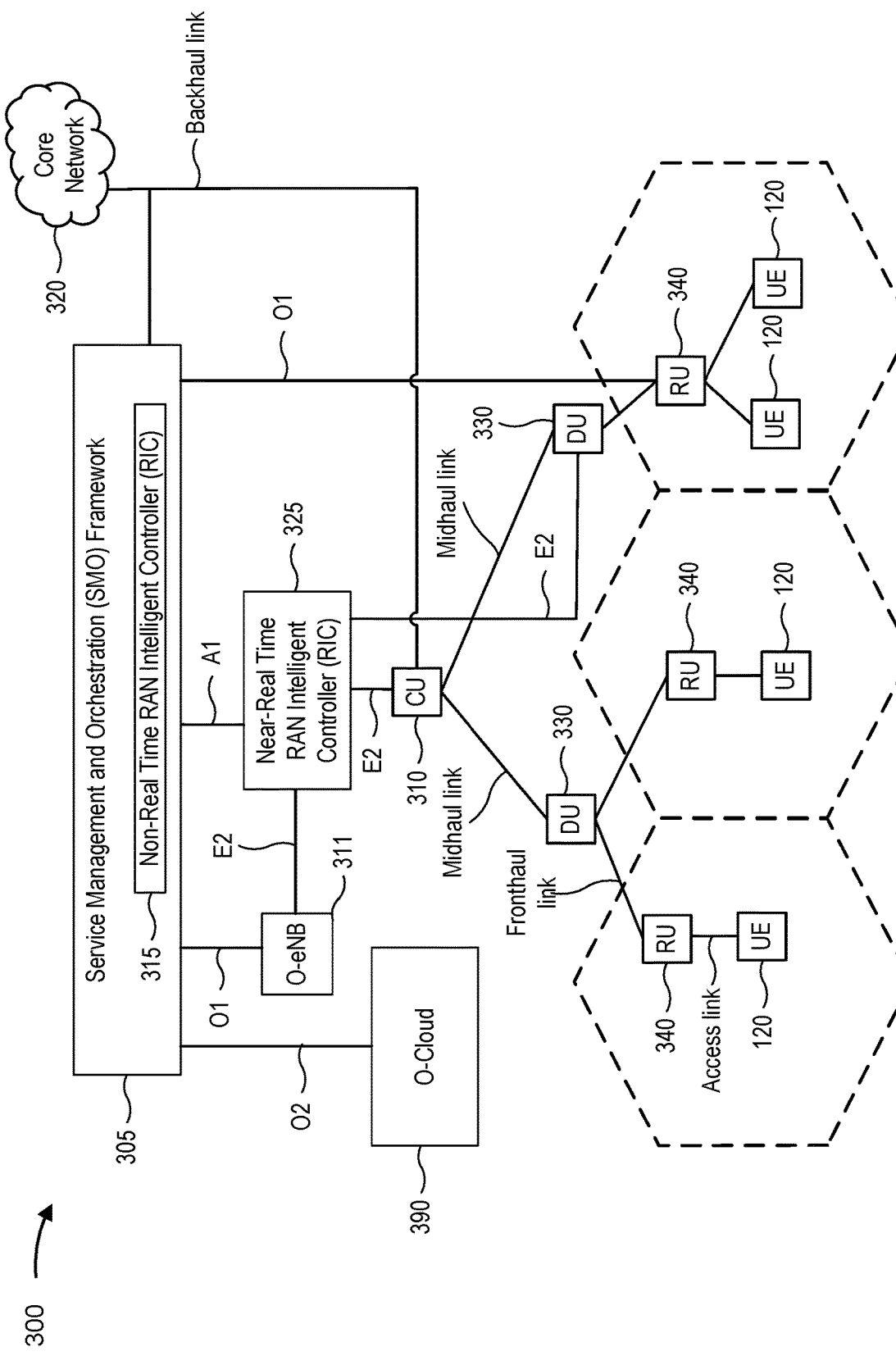
FIG. 3 is a diagram illustrating an example disaggregated base station architecture, in accordance with the present disclosure.

FIG. 3 is a diagram illustrating an example disaggregated base station 300 architecture, in accordance with the present disclosure. The disaggregated base station 300 architecture may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with respect to FIG. 3.

Figure 4:
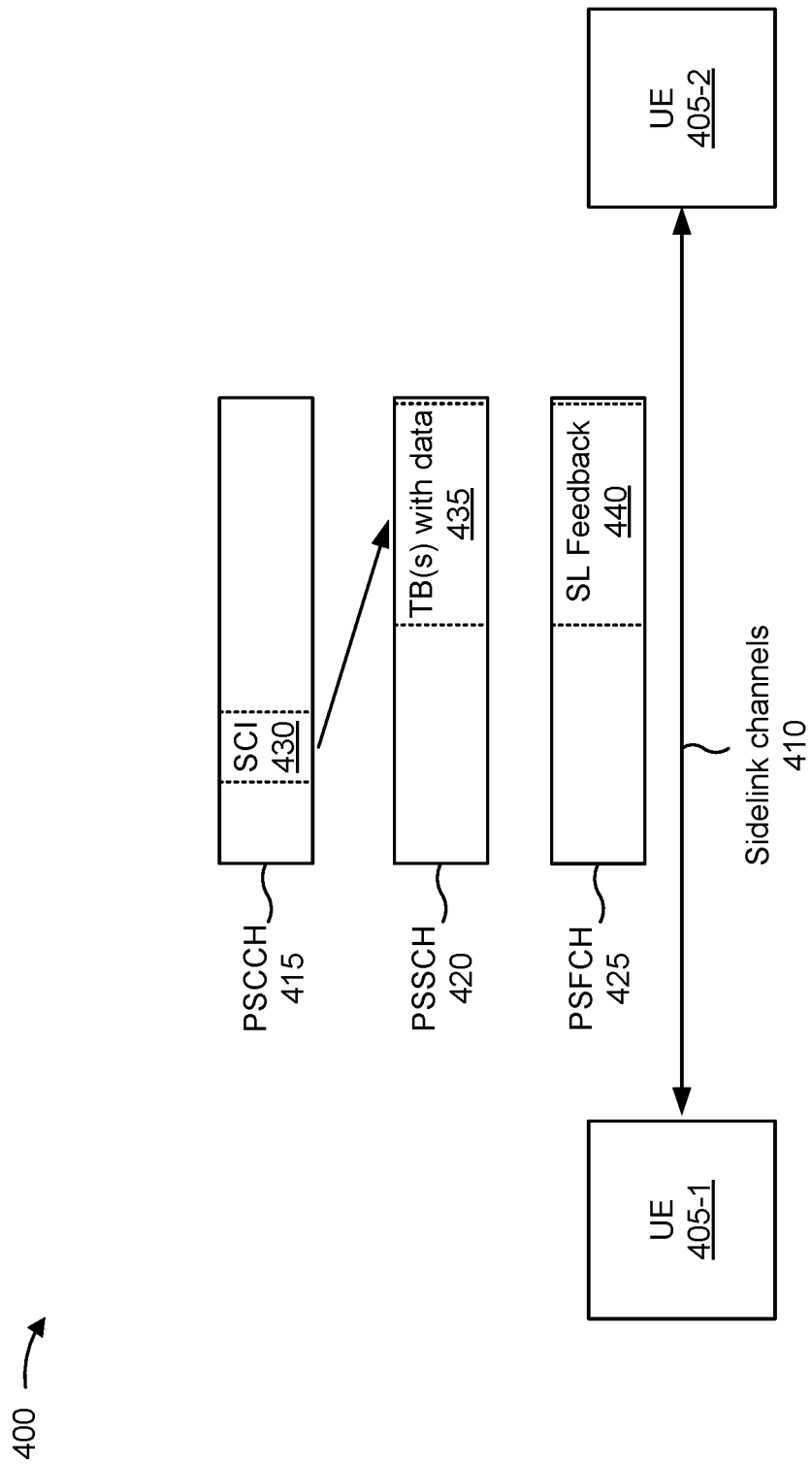
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communications, V2X communications (e.g., which may include V2V communications, V2I communications, and/or V2P communications) and/or mesh networking. In some examples, the UEs 405 (e.g., UE 405-1 and/or UE 405-2) may correspond to one or more other UEs described elsewhere herein, such as UE 120. In some examples, the one or more sidelink channels 410 may use a PC5 interface and/or may operate in a high frequency band (e.g., the 5.9 GHz band). Additionally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control channel (PSCCH) 415, a physical sidelink shared channel (PSSCH) 420, and/or a physical sidelink feedback channel (PSFCH) 425. The PSCCH 415 may be used to communicate control information, similar to a physical downlink control channel (PDCCH) used for cellular communications with a base station 110 via an access link or an access channel. The PSSCH 420 may be used to communicate data, similar to a physical downlink shared channel (PDSCH) and/or a physical uplink shared channel (PUSCH) used for cellular communications with a base station 110 via an access link or an access channel. For example, the PSCCH 415 may carry sidelink control information (SCI) 430 (e.g., first stage SCI (SCI-1)) which may indicate various control information used for sidelink communications, such as one or more resources (e.g., time resources, frequency resources, and/or spatial resources) where a transport block (TB) 435 may be carried on the PSSCH 420. The TB 435 may include data. The PSFCH 425 may be used to communicate sidelink feedback 440, such as hybrid automatic repeat request (HARQ) feedback (e.g., acknowledgement (ACK) or negative acknowledgement (NACK) (or "ACK/NACK") information).

Although shown on the PSCCH 415 in FIG. 4, in some examples, the SCI 430 may include multiple communications in different stages. For example, SCI-1 may be transmitted on the PSCCH 415, and second stage SCI (SCI-2) may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QoS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process identifier (ID), a new data indicator (NDI), a source identifier, a destination identifier, and/or a channel state information (CSI) report trigger.

In some examples, the one or more sidelink channels 410 may use resource pools. For example, a scheduling assignment (e.g., included in SCI 430) may be transmitted in sub-channels using specific resource blocks (RBs) across time. In some examples, data transmissions (e.g., on the PSSCH 420) associated with a scheduling assignment (e.g., SCI-1) may occupy adjacent RBs in the same slot as the scheduling assignment (e.g., using frequency division multiplexing).

In some examples, a UE 405 may operate using a resource allocation mode (e.g., Mode 1) in which a base station allocates resources for sidelink communications between UEs 405. In some examples, a UE 405 may operate using a resource allocation mode (e.g., Mode 2) in which resource selection and/or scheduling is autonomously performed by the UE 405 (e.g., rather than a base station 110). In some examples, the UE 405 may perform resource selection and/or scheduling by sensing channel availability for transmissions using Mode 2. For example, the UE 405 may measure an RSSI parameter (e.g., a sidelink-RSSI (S-RSSI) parameter) associated with various sidelink channels, may measure an RSRP parameter (e.g., a PSSCH-RSRP and/or PSCCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 carried in the PSCCH 415 (e.g., SCI-1), which may indicate occupied resources and/or channel parameters. Additionally, or alternatively, the UE 405 may perform resource selection and/or scheduling by determining a channel busy rate (CBR) associated with various sidelink channels, which may be used for rate control (e.g., by indicating a maximum number of RBs that the UE 405 can use for a particular set of subframes).

In the resource allocation mode 2 where resource selection and/or scheduling is performed by a UE 405, the UE 405 may generate sidelink grants with reserved resources, and the UE 405 may transmit the grants in SCI 430. A sidelink grant may indicate, for example, one or more parameters (e.g., transmission parameters) to be used for an upcoming sidelink transmission, such as one or more sub-channels to be used for the upcoming sidelink transmission on the PSSCH 420 (e.g., for TBs 435), one or more slots to be used for the upcoming sidelink transmissions, and/or an MCS to be used for the upcoming sidelink transmission. In some examples, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an aperiodic sidelink transmission.

As indicated above, FIG. 4 is provided as an example. Other examples may differ from what is described with respect to FIG. 4.

Figure 5:
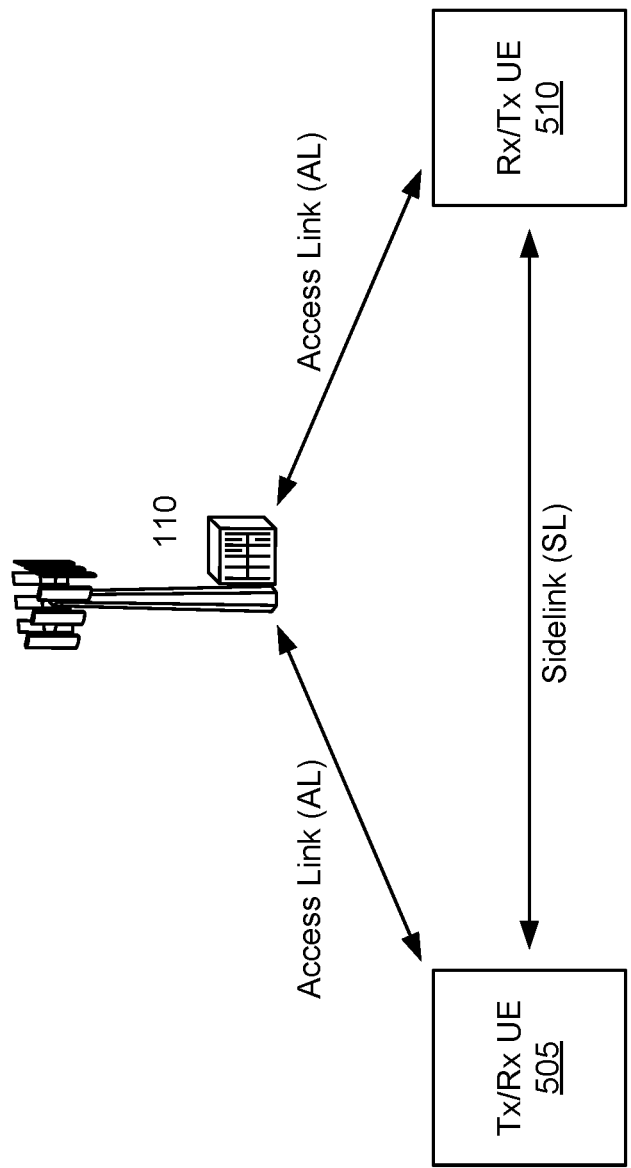
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink resource allocation modes, a base station 110 may communicate with the Tx/Rx UE 505 via a first access link. Additionally, or alternatively, in some sidelink resource allocation modes, the base station 110 may communicate with the Rx/Tx UE 510 via a second access link. The Tx/Rx UE 505 and/or the Rx/Tx ULE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
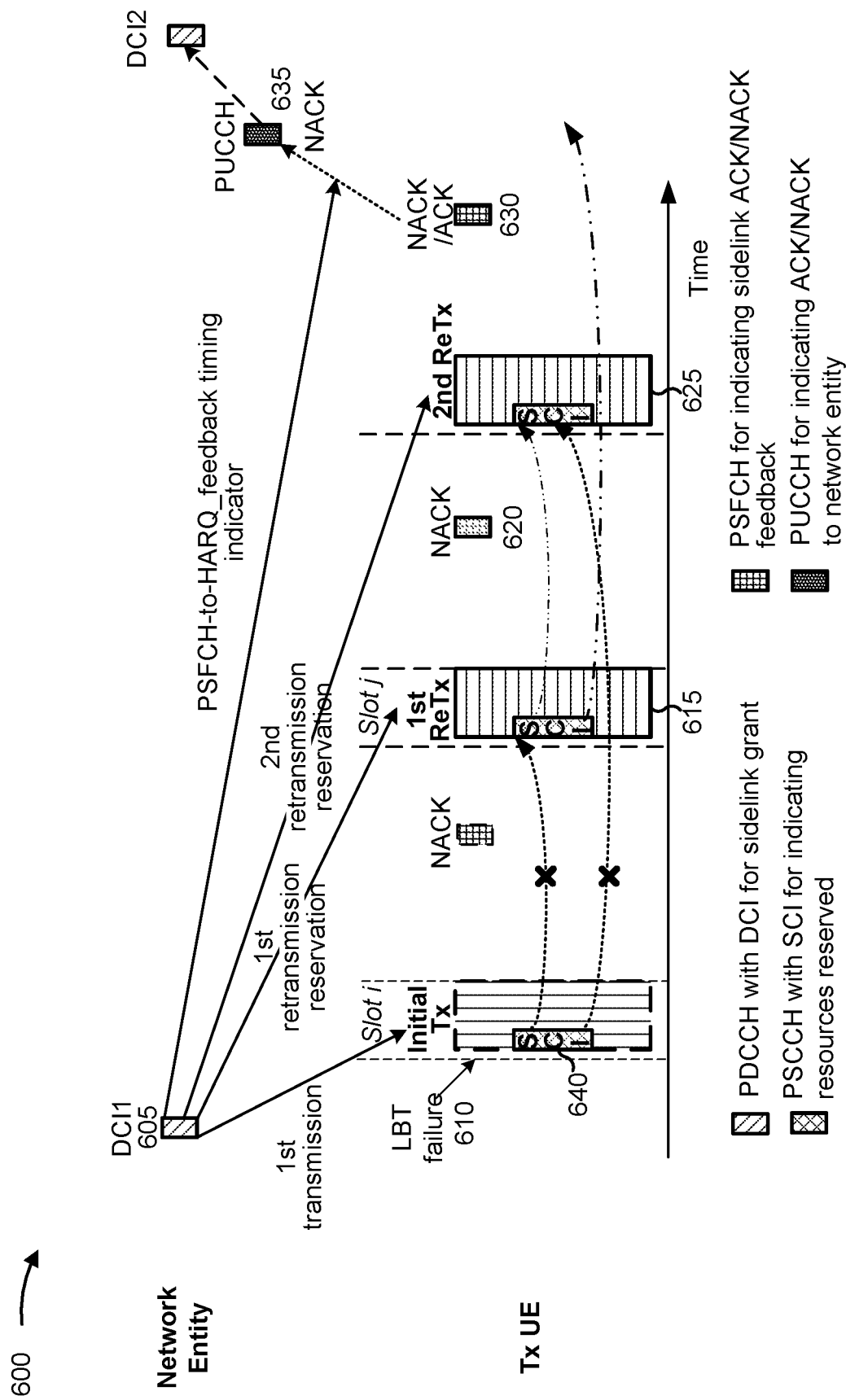
FIG. 6 is a diagram illustrating an example of sidelink communications using Mode 1 resource allocation, in accordance with the present disclosure.

FIG. 6 is a diagram illustrating an example 600 of sidelink communications using Mode 1 resource allocation, in accordance with the present disclosure, in accordance with the present disclosure.

As shown in FIG. 6, and by reference number 605, for Mode 1 sidelink resource allocation, a network entity (e.g., base station 110, CU 310, DU 330, RU 340, or a combination thereof) may transmit, and a Tx UE may receive, downlink control information (DCI) (e.g., in a PDCCH communication) that indicates a sidelink grant for the Tx UE. The DCI may indicate a resource allocation (e.g., time and frequency resources) to be used by the Tx UE for an initial transmission of a sidelink communication (e.g., a sidelink TB). For example, the DCI may indicate time gap between the DCI and a slot (e.g., slot i) in which the UE is to transmit the initial transmission of the sidelink communication to an Rx UE. In some examples, the DCI may also indicate resources (e.g., time and frequency resources) allocated for one or more (e.g., up to 2) retransmission reservations. The resources allocated for the retransmission reservations are resources to be used by the Tx UE for one or more retransmissions of the sidelink communication, for example in a case in which the Tx UE receives NACK feedback (e.g., in a PSFCH communication) from the Rx UE for the initial transmission of the sidelink communication. For example, as shown in FIG. 6, a first DCI (DCI1) 605 (e.g., for a first sidelink grant for the Tx UE) may indicate resource allocations for an initial transmission (e.g., $1^{st}$ transmission in slot i), a first retransmission reservation 615 (e.g., in slot j), and a second retransmission reservation 625. In the resources allocated for a transmission of the sidelink communication, the Tx UE may transmit a sidelink TB (e.g., in a PSSCH) and SCI 640 (e.g., in a PSCCH) that indicates the resource(s) reserved by the first DCI 605 (e.g., the first retransmission reservation 615 and the second retransmission reservation 625). The first DCI 605 (e.g., DCI1) may also indicate a physical uplink control channel (PUCCH) resource 635 to be used by the Tx UE to transmit ACK/NACK feedback to the network entity. For example, the first DCI 605 may indicate a PSFCH-to-HARQ timing indicator that indicates a time gap between a PSFCH resource 630 for sidelink feedback (e.g., ACK/NACK feedback) from the Rx UE for the final allocated transmission of the sidelink communication (e.g., the retransmission at the second retransmission reservation 625) and the PUCCH resource 635 for transmitting the ACK/NACK feedback to the network entity. In some aspects, the network may transmit a second DCI (e.g., DCI2) for another grant for one or more retransmissions for the transmission of the sidelink communication if a NACK is received at the PUCCH resource 630.

In some aspects, Mode 1 resource allocation may be used for sidelink communications in an unlicensed spectrum. "Unlicensed spectrum" refers to frequency bands (e.g., "unlicensed frequency bands") that do not have exclusive access (e.g., as opposed to the licensed spectrum, which includes frequency bands that are licensed for exclusive use). In a shared or unlicensed frequency band, a transmitting device may contend against other devices for channel access before transmitting on a shared or unlicensed channel (e.g., a channel in an unlicensed frequency band) to reduce and/or prevent collisions on the shared or unlicensed channel. To contend for channel access, the transmitting device may perform a channel access procedure, such as a listen-before-talk (or listen-before-transmit) (LBT) procedure or another type of channel access procedure, for shared or unlicensed frequency band channel access. The channel access procedure may be performed to determine whether the physical channel (e.g., the radio resources of the channel) are free to use or are busy (e.g., in use by another wireless communication device such as a UE, an IoT device, or a wireless local area network (WLAN) device, among other examples). The channel access procedure may include sensing or measuring the physical channel (e.g., performing an RSRP measurement, detecting an energy level, or performing another type of measurement) during a channel access gap (which may also be referred to as a contention window (CW)) and determining whether the shared or unlicensed channel is free or busy based at least in part on the signals sensed or measured on the physical channel (e.g., based at least in part on whether the measurement satisfies a threshold). If the transmitting device determines that the channel access procedure is successful, the transmitting device may perform one or more transmissions on the shared or unlicensed channel during a transmission opportunity (TXOP), which may extend for a channel occupancy time (COT).

In some aspects, in order to transmit a sidelink communication over a channel in the unlicensed spectrum, a Tx UE may be required to perform an LBT procedure prior to each transmission of the sidelink communication. For example, the Tx UE may be required to perform LBT procedure (e.g., a Category 4 (Cat4) LBT or a Category 2 (Cat2) LBT procedure) prior to the start of each slot allocated for sidelink transmission in the unlicensed spectrum. A Cat4 LBT procedure is a procedure that senses whether the channel is idle for a duration that includes a fixed (e.g., pre-configured) interval plus an addition interval of random duration. A Cat2 LBT procedure is a procedure that senses whether the channel is idle for a duration that includes a fixed (e.g., pre-configured) interval without an addition interval of random duration. If the LBT procedure senses that the channel in the unlicensed spectrum is idle (e.g., LBT success), the Tx UE may proceed with transmitting the sidelink communication. If the LBT procedure senses that the channel is busy (e.g., LBT failure), the Tx UE may not transmit the sidelink communication in the allocated resources. For example, as shown in FIG. 6, and by reference number 610, prior to transmitting the initial transmission of the sidelink communication in the allocated resources in slot i, the Tx UE may perform the LBT procedure (e.g., Cat4 or CAT2 LBT) and detect LBT failure. In this case, the Tx UE may not transmit the sidelink communication in the resources allocated for the initial transmission. Instead, the Tx UE may perform the LBT procedure again prior to slot j to determine whether the sidelink communication can be transmitted in the resources allocated for the next transmission (e.g., the first retransmission reservation 615).

As shown by reference number 615, the Tx UE may detect LBT success for the resources allocated for the first retransmission, and the Tx UE may transmit the sidelink communication (e.g., the sidelink TB and the SCI) to the Rx UE in slot j. As shown by reference number 620, the Tx UE may receive, from the Rx UE, a PSFCH communication including sidelink feedback (e.g., ACK/NACK feedback) for the sidelink communication transmitted in slot j. As shown by reference number 625, in a case in which the sidelink feedback is NACK feedback, the Tx UE may retransmit the sidelink communication in the resources allocated for the second retransmission (e.g., after detecting LBT success for the resources allocated for the second retransmission, as shown by reference number 625). As shown by reference number 630, the Tx UE may receive, from the Rx UE, a PSFCH communication including sidelink feedback (e.g., ACK/NACK feedback) for the sidelink communication transmitted in the resources allocated for the second retransmission. As shown by reference number 635, the Tx UE may then transmit the ACK/NACK feedback to the network entity via the PUCCH resource, as shown by reference number 635, indicated (e.g., by the PSFCH-to-HARQ timing indicator) in DCI1. In a case in which the feedback transmitted to the network entity in the PUCCH resource is a NACK feedback, the network entity may transmit, to the Tx UE, a second DCI (e.g., DCI2) for a second sidelink grant that allocates additional resources for the Tx UE to use to transmit the sidelink communication (e.g., retransmit the TB for the sidelink communication).

In some examples, for sidelink communications in the unlicensed spectrum, if the Tx UE detects LBT failure for the resources allocated for a transmission of a sidelink communication (e.g., the initial transmission in FIG. 6), the Tx UE waits for the resources allocated in the DCI (e.g., DCI1) for the next transmission of the sidelink communication (e.g., the first retransmission reservation as shown by reference number 615 in FIG. 6). In some examples, the DCI including the sidelink grant may not indicate reserved resources for one or more retransmissions of the sidelink communication. In such cases, if the Tx UE detects LBT failure for the resources allocated for the transmission of a sidelink communication, the Tx UE waits for a second grant (e.g., DCI2) for a second resource allocation for transmitting the sidelink communication. In either case (e.g., with or without allocated resources for sidelink retransmissions in the first DCI as shown by reference number 605), LBT failure may cause delays in transmitting sidelink communications in the unlicensed spectrum. Such delays may cause the Tx UE to drop transmissions of sidelink TBs due to failure to satisfy latency requirements associated with sidelink traffic, which may result in decreased reliability of sidelink communications in the unlicensed spectrum.

Some techniques and apparatuses described herein enable a network entity to transmit, and a first UE to receive, an indication of multiple transmission occasions for a transmission of a sidelink communication in an unlicensed spectrum. The first UE may transmit, to a second UE, the sidelink communication in a selected transmission occasion of the multiple transmission occasions for the transmission of the sidelink communication in the unlicensed spectrum. Accordingly, the first UE may transmit the sidelink communication in one of the multiple transmission occasions (e.g., if another of the transmission occasions cannot be used) without having to wait for a second grant, thereby reducing delay in transmission of the sidelink communication. In some aspects, the first UE may perform an LBT procedure for one or more of the multiple transmission occasions, and the selected transmission occasion, in which the sidelink communication is transmitted, may be selected based at least in part on performing the LBT procedure. For example, the first UE may select a transmission occasion for which the LBT is successful from the multiple transmission occasions indicated by the indication for the transmission of the sidelink communication. As a result, delays due to LBT failures preventing transmission of sidelink communications in allocated resources for sidelink transmissions are reduced. Such reduced delays reduce dropped sidelink TBs caused by failure to satisfy latency requirements of sidelink traffic, and thus, increase the reliability of sidelink communications in the unlicensed spectrum.

As indicated above, FIG. 6 is provided as an example. Other examples may differ from what is described with respect to FIG. 6.

Figure 7:
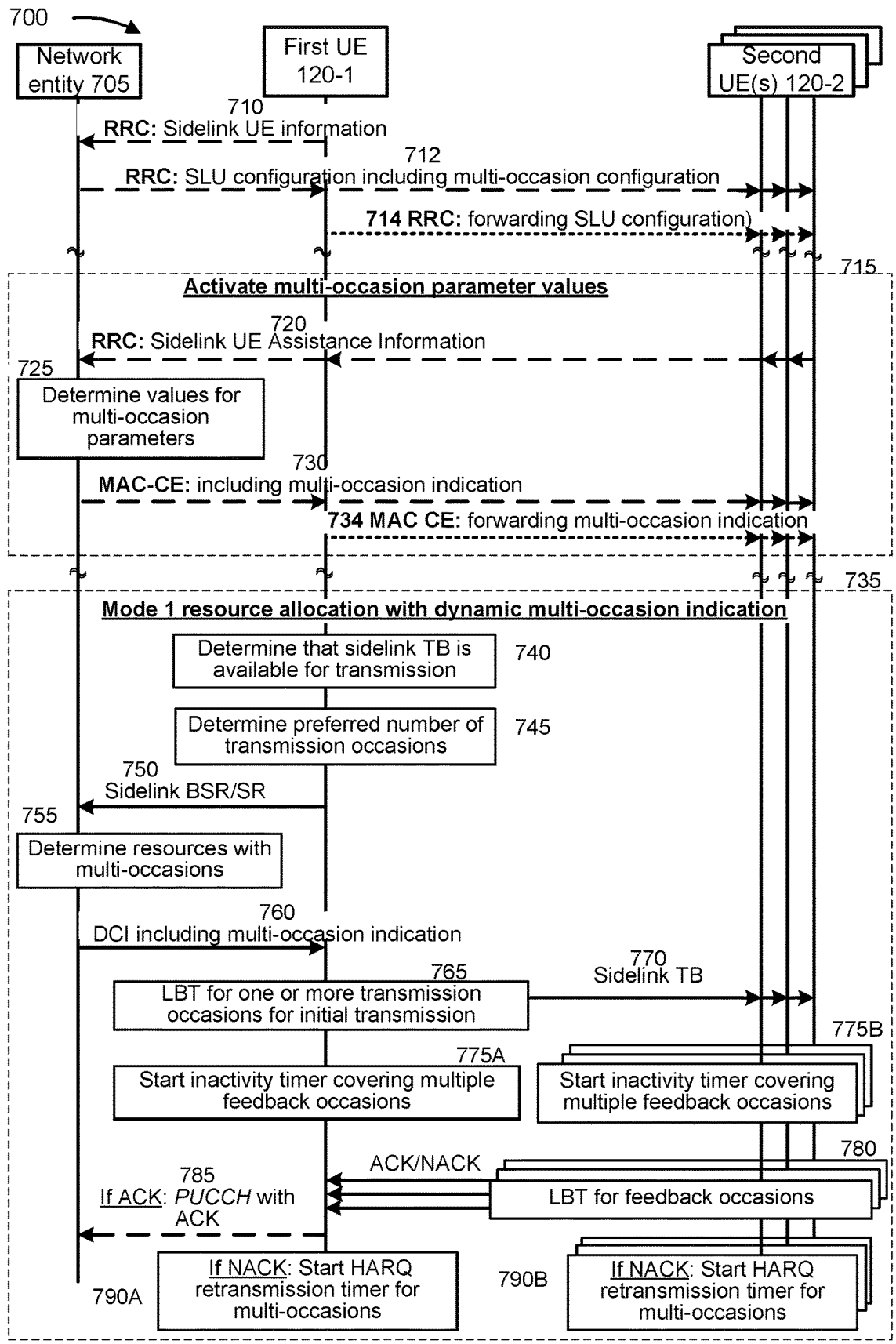
FIGS. 7-9 are diagrams illustrating examples associated with resource allocation for unlicensed spectrum sidelink communications, in accordance with the present disclosure.

FIG. 7 is a diagram illustrating an example 700 associated with resource allocation for unlicensed spectrum sidelink communications, in accordance with the present disclosure. As shown in FIG. 7, example 700 includes communication between a network entity 705 (e.g., base station 110, CU 310, DU 330, RU 340, or a combination thereof), a first UE 120-1, and one or more second UEs 120-2. In some aspects, the network entity 705 and the UEs 120 (e.g., the first UE 120-1 and the one or more second UEs 120-2) may be included in a wireless network, such as wireless network 100. In some aspects, one or more second UEs 120-2 may not be included in a wireless network, such as wireless network 100 with the network entity 705. The network entity 705 and the UEs 120 may communicate via a wireless access link, which may include an uplink and a downlink. The first UE 120-1 and the one or more second UEs 120-2 may communicate via a sidelink. In some aspects, the first UE 120-1 and the one or more second UEs 120-2 may communicate via sidelink communications using Mode 1 resource allocation. In some aspects, the first UE 120-1 may be a Tx UE for a sidelink communication, and the one or more second UEs 120-2 may be one or more Rx UEs for the sidelink communication.

As shown in FIG. 7, and by reference number 712, the network entity 705 may transmit, to the first UE 120-1, a sidelink unlicensed (SLU) configuration. The first UE 120-1 may receive the SLU configuration transmitted by the network entity 705. For example, the network entity 705 may transmit, to the first UE 120-1, an RRC communication including the SLU configuration, for example, based on an RRC communication, shown by reference number 710, transmitted by the first UE 120-1, where the RRC communication may indicate sidelink UE information (e.g., including a sidelink transmit resource request containing a layer 2 (L2) destination identifier (ID), quality of service (QoS) profiles, and/or sidelink UE capability information indicating supporting sidelink communications on shared or unlicensed spectrums and the related band combinations for shared or unlicensed spectrum, etc.). In some aspects, the network entity 705 may also transmit the SLU configuration (e.g., in one or more RRC communications) to one or more of the second UEs 120-2. For example, the network entity 705 may transmit the SLU configuration to one or more of the second UEs 120-2 that are in a coverage area of the network entity 705. In some aspects, the first UE 120-1 may forward the SLU configuration by reference number 714 (e.g., in one or more sidelink RRC communications via the PC5 interface) to one or more of the second UEs 120-2. For example, the first UE 120-1 may transmit the SLU configuration to one or more second UEs 120-2 that are not in the coverage area of the network entity 705. The second UEs 120-2 may receive the SLU configuration from the network entity 705 or the first UE 120-1.

The SLU configuration may include one or more configurations that configure the first UE 120-1 and the second UEs 120-2 for sidelink communications (e.g., using Mode 1 resource allocation) in an unlicensed spectrum. In some aspects, the SLU configuration may configure the first UE 120-1 and the second UEs 120-2 to use sidelink communications in the unlicensed spectrum for one or more services. For example, the one or more services, for which the UEs 120 are configured to use unlicensed spectrum sidelink communications, may be associated with one or more configurations included in the SLU configuration respective, for example, based on the QoS profiles, cast types and/or L2 destination IDs of sidelink communications. For example, more occasions may be configured for a QoS profile or L2 destination ID with high reliability or priority sidelink communication in the unlicensed spectrum. For another example, small gap or no gap in time between adjacent occasions for a QoS profile or L2 destination ID with low latency (e.g., packet delay budget (PDB)) sidelink communication in the unlicensed spectrum.

In some aspects, the SLU configuration may include one or more configurations and each of which may include a multi-occasion configuration for resource allocation for sidelink communications in the unlicensed spectrum. In some aspects, the multi-occasion configuration for resource allocation may configure the first UE 120-1 and the second UEs 120-2 with multiple transmission occasions for each allocated sidelink transmission in the unlicensed spectrum. In some aspects, the multi-occasion configuration for resource allocation may also configure the first UE 120-1 and the second UEs 120-2 with multiple feedback occasions for transmitting sidelink feedback (e.g., HARQ ACK/NACK feedback) associated with a transmission of a sidelink communication in the unlicensed spectrum.

In some aspects, the multi-occasion configuration for resource allocation may include an indication of a configuration for the multiple feedback occasions for one or more allocated transmissions (e.g., an initial transmission and/or retransmission) of a sidelink communication in the unlicensed spectrum. For example, the multi-occasion configuration for resource allocation may include multi-occasion parameters that define the multiple transmission occasions relative to a first transmission occasion for an allocated transmission (e.g., an initial transmission or retransmission), where the first transmission occasion for an allocated transmission is indicated by a resource allocation (e.g., resources in time and frequency, as well as in space using a spatial filter for a beam, for example, with the indication of transmission configuration indicator (TCI) or beam association with SSB or CSI-RS) via RRC configuration, MAC CE activation or DCI signaling for a sidelink grant. In some aspects, the multi-occasion parameters may include a number of transmission occasions for each allocated sidelink transmission and at least one of a time gap (e.g., referred as tx_gap herein) between consecutive transmission occasions in the time domain or a frequency offset between adjacent transmission occasions in the frequency domain. In some aspects, the multi-occasion configuration may include an indication of a number of transmission occasions (e.g., m transmission occasions), and the indicated number (e.g., m) may be the number of transmission occasions for each transmission for which resources are allocated in a sidelink grant. In this case, the indicated number (e.g., m) of transmission occasions indicates the number of transmission occasions for each of an initial transmission and any retransmission reservations allocated in a sidelink grant. Alternatively, in some aspects, the multi-occasion configuration for resource allocation may indicate different numbers of transmission occasions respectively for the initial transmission (e.g., m1) and one or more retransmissions (e.g., m2) of a sidelink communication.

In some aspects, the multiple transmission occasions for an allocated transmission (e.g., an initial transmission or retransmission) of a sidelink communication in the unlicensed spectrum may include a plurality of transmission occasions at different times (e.g., at different slots or mini-slots). In this case, the multi-occasion configuration may indicate the number of transmission occasions at different times (e.g., for the initial transmission and each allocated retransmission reservation) and a time gap (e.g., tx_gap) between consecutive transmission occasions in time of the multiple transmission occasions. For example, the time gap may be an indication of a number of slots or mini-slots (e.g., tx_gap=0, 1, 2, . . . slots/mini-slots) between consecutive transmission occasions for an allocated transmission of a sidelink communication.

In some aspects, the multiple transmission occasions for an allocated transmission (e.g., an initial transmission or retransmission) of a sidelink communication in the unlicensed spectrum may include a plurality of transmission occasions at different frequencies. For example, the multiple transmission occasions for an allocated transmission of a sidelink communication may include a plurality of transmission occasions at different frequencies in the same slot (or mini-slot). In some aspects, for wide band operation, the sidelink bandwidth part (BWP) may include multiple LBT sub-bands. For example, in a standard promulgated by 3GPP, LBT may be performed on 20 MHz sub-bands in order to transmit in an unlicensed spectrum. In some aspects, the multi-occasion configuration may indicate multiple transmission occasions at different frequencies in different LBT sub-bands. In some aspects, the multi-occasion configuration may indicate the number of transmission occasions (e.g., m) at different frequencies (e.g., for the initial transmission and each allocated retransmission reservation) and a frequency offset (e.g., referred herein as tx_offset, in subchannels or PRBs) between adjacent transmission occasions in the frequency domain of the multiple transmission occasions.

In some aspects, the multiple transmission occasions for an allocated transmission (e.g., an initial transmission or retransmission) of a sidelink communication in the unlicensed spectrum may include transmission occasions at different times (e.g., at different slots or mini-slots) and transmission occasions at different frequencies (e.g., in different LBT sub-bands). In some aspects, the multiple transmission occasions for an allocated transmission (e.g., an initial transmission or retransmission) of a sidelink communication in the unlicensed spectrum may include transmission occasions at a combination of different times (e.g., at different slots or mini-slots) and different frequencies (e.g., in different LBT sub-bands). In either case, the multi-occasion configuration for resource allocation may include an indication of the time gap (e.g., tx_gap) between consecutive transmission occasions in time and an indication of the frequency offset (e.g., tx_offset) between adjacent transmission occasions in the frequency domain (e.g., at each slot or mini-slot indicated by the time gap).

In some aspects, the multi-occasion configuration for resource allocation may indicate a configuration for multiple feedback occasions for sidelink feedback associated with each allocated transmission (e.g., an initial transmission or retransmission) for a sidelink communication. For example, the multi-occasion parameters may include parameters that define the multiple feedback occasions for the sidelink feedback associated with each allocated sidelink transmission relative to a first feedback occasion (e.g., a PSFCH resource) in a resource pool that meets a minimum HARQ processing time from a last transmission occasion for the allocated transmission. In some aspects, the multi-occasion configuration may include an indication of a number of feedback occasions (e.g., n feedback occasions), and the indicated number (e.g., n) may be the number feedback occasions for transmitting sidelink feedback associated with each transmission for which resources are allocated in a sidelink grant. Alternatively, in some aspects, the multi-occasion configuration for resource allocation may indicate different numbers of feedback occasions respectively for sidelink feedback associated with the initial transmission (e.g., n1) and for sidelink feedback associated with one or more retransmissions (e.g., n2) of a sidelink communication.

In some aspects, the multiple feedback occasions for transmitting sidelink feedback associated with an allocated transmission (e.g., an initial transmission or retransmission) of a sidelink communication in the unlicensed spectrum may include a plurality of feedback occasions at different times (e.g., at different slots or mini-slots or different symbols within a slot or mini-slot). In this case, the multi-occasion configuration for resource allocation may indicate the number of feedback occasions at different times (e.g., for sidelink feedback associated with each allocated transmission) and a time gap (e.g., fd_gap) between consecutive feedback occasions in time of the multiple feedback occasions. For example, the time gap (e.g., fd_gap) may be an indication of a number of slots or mini-slots or symbols (e.g., fd_gap=0, 1, 2, . . . slots/mini-slots/symbols) between consecutive feedback occasions for transmitting sidelink feedback associated with an allocated transmission of a sidelink communication.

In some aspects, the multiple feedback occasions for sidelink feedback associated with an allocated transmission of a sidelink communication in the unlicensed spectrum may include a plurality of feedback occasions at different frequencies (e.g., in different LBT sub-bands). For example, the multiple feedback occasions may include a plurality of feedback occasions at different frequencies in the same slot (or mini-slot or symbol). In some aspects, the multi-occasion configuration may indicate the number of feedback occasions (e.g., n) at different frequencies (e.g., for sidelink feedback associated each allocated transmission) and a frequency offset (e.g., fd_offset) between adjacent feedback occasions in the frequency domain of the multiple feedback occasions.

In some aspects, the multiple feedback occasions for transmitting sidelink feedback associated with an allocated transmission of a sidelink communication in the unlicensed spectrum may include feedback occasions at different times (e.g., at different slots or mini-slots or symbols) and feedback occasions at different frequencies (e.g., in different LBT sub-bands). In some aspects, the multiple feedback occasions for transmitting sidelink feedback associated with an allocated transmission of a sidelink communication in the unlicensed spectrum may include feedback occasions at a combination of different times (e.g., at different slots or mini-slots) and different frequencies (e.g., in different LBT sub-bands). In either case, the multi-occasion configuration may include an indication of the time gap (e.g., fd_gap) between consecutive feedback occasions in time and an indication of the frequency offset (e.g., fd_offset) between adjacent feedback occasions in the frequency domain (e.g., at each slot or mini-slot or symbol indicated by the time gap).

In some aspects, the SLU configuration (e.g., included in the RRC communication) may indicate a plurality of multi-occasion configurations with corresponding identifiers or indexes. For example, the plurality of multi-occasion configurations included in the SLU configuration (e.g., in the RRC communication) may include multi-occasion configurations associated with different QoS profiles, different cast types, different CBR levels, and/or different LBT success or failure rates, among other examples. In this case, different multi-occasion configurations may indicate different values for the multi-occasion parameters, such as the number of transmission occasions (e.g., a set or list of m values), the time gap (e.g., a set or list of tx_gap values) and/or the frequency offset (e.g., a set or list of tx_offset values) between the transmission occasions, the number of feedback occasions (e.g., a set or list of n values), and/or the time gap (e.g., a set or list of fd_gap values) and/or frequency offset (e.g., a set or list of fd_offset values) between the feedback occasions.

In some aspects, the one or more multi-occasion configurations may be reconfigured via RRC reconfiguration, for example, based on the reports from the UEs 120, where a report may be carried on an RRC communication from one of UEs 120 (e.g. sidelink UE assistance information containing LBT information associated with the UE, such as an LBT success or failure rate and/or a count of consecutive LBT failures, and/or channel information or measurements, such as CBR rates, RSRP, and/or RSRQ, among other examples).

In some aspects, the multi-occasion configuration with multiple transmission occasions (e.g., m for the number of multiple occasions and the associated tx_gap in time or tx_offset in frequency) for an allocated transmission (e.g., an initial transmission or retransmission) within the period (e.g., sl-PeriodCG) of a configured grant (e.g., identified by sl-ConfigIndexCG) for a sidelink communication in the unlicensed spectrum may be included in one or multiple configurations for sidelink configured grant type 1. For example, the multi-occasion configuration may be included in configured grant configuration (e.g., SL-ConfiguredGrantConfig for configured grant type 1), where the multiple occasions for a first allocated transmission may be relative to (e.g., the gap in time or offset in frequency) the first occasion of the first allocated transmission configured (e.g., first occasion of the first allocated transmission is configured via sl-TimeOffsetCG-Type1 and sl-TimeReferenceSFN-Type1 in time domain and sl-StartSubchannelCG-Type1 in frequency domain for configured grant type 1) and the multiple occasions for a second or a third allocated transmission may be relative to (e.g., the gap in time or offset in frequency) the first occasion of the second or the third allocated transmission configured (e.g., first occasion of the second or third allocated transmission is configured via sl-TimeResourceCG-Type1 in time domain and sl-FreqResourceCG-Type1 in frequency domain for configured grant type 1).

In some aspects, the multi-occasion configuration with multiple feedback occasions (e.g., n for the number of multiple feedback occasions and the associated fd_gap in time or fd_offset in frequency) for sidelink feedback associated with each allocated transmission (e.g., an initial transmission or retransmission) within the period (e.g., sl-PeriodCG) of a configured grant (e.g., identified by sl-ConfigIndexCG) for a sidelink communication in the unlicensed spectrum may be included in one or multiple configurations for sidelink configured grant type 1. For example, the multi-occasion configuration may be included in configured grant configuration (e.g., SL-ConfiguredGrantConfig for configured grant type 1), where the multiple feedback occasions for sidelink feedback associated with each allocated transmission may be based on the feedback resource allocations within a resource pool (e.g., identified by sl-ResourcePoolID). For example, multiple symbols at the end of a slot may be allocation for multiple feedback occasions associated to one or more transmissions in one or more slots prior to the slot containing feedback resources. For another example, multiple consecutive slots or mini-slots may contain feedback resources for multiple feedback occasions associated to one or more transmissions in one or more slots or mini-slots prior to the slot containing feedback resources. For another example, multiple LBT sub-bands may contain feedback resources for multiple feedback occasions, at same symbol(s) with same slot(s) or mini-slot(s), associated to one or more transmissions in same or different LBT sub-bands within one or more slots or mini-slots prior to the slot or mini-slot containing feedback resources. In this case, the gap in time or offset in frequency for multiple feedback occasions associated to a allocated transmission is implicitly indicated or structured in a resource pool with feedback resources allocated, where the multiple feedback occasions may be mapped to the feedback resource allocations per the order in time order (e.g., the first occasion is mapped to the first feedback symbol, and second feedback occasion is mapped to the second feedback symbol) or may be mapped to the feedback resource allocations per the order in frequency (e.g., starting from the lowest frequency resource, for example, the first occasion is mapped to the first LBT sub-band, and second feedback occasion is mapped to the second LBT sub-band). Additionally, an ACK-only feedback resource on uplink in licensed spectrum (e.g., ACK-only PUCCH resource) after last transmission occasion for each allocation transmission may be configured (e.g., sl-ACKPSFCH-ToPUCCH-CG-Type1 and sl-N1ACKPUCCH-AN), and an ACK/NACK feedback resource on uplink in licensed spectrum (e.g., ACK/NACK PUCCH resource) after the last feedback occasion associated with the last allocated transmission may be configured (e.g., sl-PSFCH-ToPUCCH-CG-Type1 and sl-N1PUCCH-AN). In some aspects, the PUCCH resource indication for ACK-only may be the same as the PUCCH resource indication if only sl-N1PUCCH-AN is configured (e.g., sl-N1ACKPUCCH-ANis not configured).

As further shown in FIG. 7, and by reference number 715, in some aspects, the network entity 705 may activate multi-occasion parameter values for the first UE 120-1 and/or one or more of the second UEs 120-2 via an indication in a MAC control element (MAC-CE) transmitted by the network entity 705 on the access link. Operations relating to activation of the multi-occasion parameter values are described in greater detail in connection with reference numbers 720, 725, 730, and 734.

As shown by reference number 720, the first UE 120-1 may transmit an RRC communication (e.g., sidelink UE assistance information on the access link) to the network entity 705. In some aspects, one or more of the second UEs 120-2 (e.g., one or more of the second UEs 120-2 that are in the coverage area of the network entity 705) may transmit the sidelink UE assistance information to the network entity 705. In some aspects, one or more of the second UEs 120-2 (e.g., one or more of the second UEs 120-2 that are not in the coverage area of the network entity 705) may transmit sidelink UE assistance information to the first UE 120-1 (e.g., a PC5 RRC communication on sidelink), and the first UE 120-1 may forward the sidelink UE assistance information associated with those second UEs 120-2 to the network entity 705 (e.g., sidelink UE assistance information on access link). The network entity 705 may receive the sidelink UE assistance information transmitted by the first UE 120-1 and the second UEs 120-2. In some aspects, the sidelink UE assistance information transmitted from a UE (e.g., the first UE 120-1 or a second UE 120-2) may include LBT information associated with the UE, such as an LBT success or failure rate and/or a count of consecutive LBT failures. The sidelink UE assistance information transmitted from a UE may also include channel information or measurements, such as CBR rates, RSRP, and/or RSRQ, among other examples.

As shown by reference number 725, the network entity 705 may determine values for the multi-occasion parameters based at least in part on the RRC communication (e.g., sidelink UE assistance information) received from the first UE 120-1 and the second UEs 120-2. For example, the network entity 705 may determine multi-occasion parameters, such as the number of the multiple transmission occasions for each allocated sidelink transmission, the time gap and/or frequency offset between the multiple transmission occasions for each allocated sidelink transmission, the number of the multiple feedback occasions for sidelink feedback associated with each allocated sidelink transmission, and/or the time gap and/or the frequency offset between the multiple feedback occasions for the sidelink feedback associated with each allocated sidelink transmission. In some aspects, the network entity 705 may determine a set of multi-occasion parameter values to activate based at least in part on the LBT information (e.g., the LBT success or failure rate and/or the count of consecutive LBT failures) and/or the channel information (e.g., CBR rate, RSRP, and/or RSRQ) included in the sidelink UE assistance information. For example, the network entity 705 may select a larger number of transmission occasions and/or a larger number of feedback occasions in connection with a low CBR or RSRP measurement and/or a low LBT success rate (or high LBT failure rate or count of consecutive LBT failures).

In some aspects, the network entity 705 may determine the values for the multi-occasion parameters by selecting a multi-occasion configuration from a plurality of multi-occasion configurations included in the SLU configuration. In this case, the network entity 705 may select the multi-occasion configuration in accordance with the LBT information and/or the channel information included in the sidelink UE assistance information. For example, the network entity 705 may select, from the plurality of multi-occasion configurations, a multi-occasion configuration associated with the LBT success or failure rate or the CBR. Alternatively, in some aspects, the network entity 705 may determine a set of values for the multi-occasion parameters independent of any multi-occasion configurations indicated in the SLU configuration. In some aspects, the network entity 705 may select a single multi-occasion configuration or a single set of multi-occasion parameter values to activate. In some aspects, the network entity 705 may select multiple multi-occasion configurations or multiple sets of multi-occasion parameter values to activate. For example, the network may determine a set of values for the multi-occasion parameters with reduced number of occasions and/or increased gap in time if the channel is congested as indicated by the channel information (e.g., high CBR or RSRP measurements). For another example, the network may determine a set of values for the multi-occasion parameters with increased number of occasions and/or reduced gap in time to improve LBT performance if the LBT performance is low as indicated by the LBT information (e.g., low LBT success rate or high LBT failure rate and/or high count of consecutive LBT failures).

As shown by reference number 730, the network entity 705 may transmit, to the first UE 120-1, a MAC-CE (e.g., a Uu MAC-CE) that includes a multi-occasion indication. The first UE 120-1 may receive the MAC-CE transmitted by the network entity 705. In some aspects, the network entity 705 may transmit the MAC-CE including the multi-occasion indication to one or more of the second UEs 120-2 (e.g., to one or more second UEs 120-2 in the coverage area of the network entity 705). In some aspects, the first UE 120-1 may forward the MAC-CE including the multi-occasion indication to one or more of the second UEs 120-2, as shown by reference number 734. For example, the first UE 120-1 may forward the MAC-CE including the multi-occasion indication to one or more of the second UEs 120-2 via a PC5 MAC-CE. For example, the first UE 120-1 may forward the MAC-CE to one more second UEs 120-2 that are not in the coverage area of the network entity 705.

The MAC-CE with multi-occasion indication may indicate activated multi-occasion parameter values determined by the network entity 705. For example, the MAC-CE with multi-occasion indication may indicate activated values for the number of transmission occasions for each allocated sidelink transmission (e.g., values for m), the time gap (e.g., values for tx_gap) and/or frequency offset (e.g., values for tx_offset) between the transmission occasions for each allocated sidelink transmission, the number of feedback occasions (e.g., values for n) for sidelink feedback associated with each allocated sidelink transmission, and/or the time gap (e.g., values for fd_gap) and/or the frequency offset (e.g., values for fd_offset) between the feedback occasions for the sidelink feedback associated with each allocated sidelink transmission. In some aspects, the multi-occasion indication included in the MAC-CE may be an indication of an identifier or an index associated with a multi-occasion configuration indicated in the SLU configuration. In some aspects, the MAC-CE may include an indication of a single activated multi-occasion configuration or a single set of activated multi-occasion parameter values. In some aspects, the MAC-CE may include indications of multiple activated multi-occasion configurations or multiple sets of activated multi-occasion parameter values.

In some aspects, the multi-occasion indication included in the MAC-CE may indicate an activation of multiple transmission occasions for each allocated transmission of a sidelink communication (e.g., for an initial transmission and any retransmission reservations allocated in a sidelink grant). In some aspects, the multiple transmission occasions for each allocated transmission may include multiple transmission occasions at different times. In this case, the multi-occasion indication may indicate the number of transmission occasions for each allocated transmission and the time gap between consecutive transmission occasions of the multiple transmission occasions. In some aspects, the multiple transmission occasions for each allocated transmission may include multiple transmission occasions at different frequencies. In this case, the multi-occasion indication may indicate the number of transmission occasions for each allocated transmission and the frequency offset between the adjacent transmission occasions of the multiple transmission occasions.

In some aspects, the multi-occasion indication included in the MAC-CE may indicate an activation of multiple feedback occasions for transmitting sidelink feedback associated with each allocated transmission of a sidelink communication (e.g., sidelink feedback for an initial transmission and for any retransmission reservations allocated in a sidelink grant). In some aspects, the multiple feedback occasions for sidelink feedback associated with each allocated transmission may include multiple feedback occasions at different times. In this case, the multi-occasion indication may indicate the number of feedback occasions for sidelink feedback associated with each allocated transmission and the time gap between consecutive transmission feedback of the multiple feedback occasions. In some aspects, the multiple feedback occasions for sidelink feedback associated with each allocated transmission may include multiple feedback occasions at different frequencies. In this case, the multi-occasion indication may indicate the number of feedback occasions for sidelink feedback associated with each allocated transmission and the frequency offset between the adjacent feedback occasions of the multiple feedback occasions.

As further shown in FIG. 7, and by reference number 735, in some aspects, resources for transmitting sidelink communications in an unlicensed spectrum may be allocated using Mode 1 resource allocation with dynamic multi-occasion indication. Operations relating Mode 1 resource allocation with the dynamic multi-occasion indication are described in greater detail in connection with reference numbers 740, 745, 750, 755, 760, 765, 770, 775A, 775B, 780, 785, 790A, and 790B.

As shown by reference number 740, the first UE 120-1 may determine that a sidelink TB is available for transmission. For example, the first UE 120-1 may determine that sidelink data to be transmitted to one or more of the second UEs 120-2 has arrived in a sidelink buffer of the first UE 120-1.

As shown by reference number 745, the first UE 120-1, in connection with determining that the sidelink TB is available for transmission, may determine a preferred number of transmission occasions for each allocated transmission to be granted for transmitting the sidelink TB. In some aspects, the first UE 120-1 may determine the preferred number of transmission occasions for the allocated transmissions to be granted for the sidelink TB based at least in part on or more QoS requirements, such as a priority, a reliability requirement, and/or a latency requirement (e.g., a packet delay budget (PDB)), associated with the sidelink TB. For example, the first UE 120-1 may select a preferred number of transmission occasions that corresponds to at least one of the priority, the reliability requirement, or the PDB associated with the sidelink TB to be transmitted by the first UE 120-1. In some aspects, the first UE 120-1 may determine one or more other preferred multi-occasion parameter values (e.g., a preferred number of feedback occasions, a preferred time gap or frequency offset for the multiple transmission occasions, and/or a preferred time gap or frequency offset for the multiple feedback occasions) based at least in part on the one or more QoS requirements of the sidelink TB, for example, more occasions for a TB transmission with higher reliability or priority, or low or no time gap for a TB with low latency or PDB. In some aspects, the first UE 120-1 may determine one or more other preferred multi-occasion parameter values (e.g., a preferred number of feedback occasions, a preferred time gap or frequency offset for the multiple transmission occasions, and/or a preferred time gap or frequency offset for the multiple feedback occasions) based at least in part on the channel condition (e.g., based on the CBR or RSRP or RSRQ measurement) of LBT performance (e.g., the LBT success or failure rate and/or the count of consecutive LBT failures). For example, the first UE 120-1 may determine fewer occasions or larger time gap for a TB if the channel is congested with high CBR or RSRP measurement. For another example, the first UE 120-1 may determine more occasions or low or no time gap for a TB if the LBT performance is poor with low success rate or high LBT failure rate or high count of consecutive LBT failures.

As shown by reference number 750, the first UE 120-1 may transmit, to the network entity 705, an indication requesting a sidelink grant for transmitting sidelink communications in an unlicensed spectrum (e.g., a sidelink buffer status report (BSR) and/or a sidelink schedule request (SR)). The network entity 705 may receive the sidelink BSR and/or SR transmitted by the first UE 120-1. The first UE 120-1 may transmit the sidelink BSR to the network entity 705 in a MAC-CE. The sidelink BSR may indicate a request for a sidelink grant to transmit the sidelink TB and an amount of sidelink data that is available to be transmitted in the sidelink buffer of the first UE 120-1 and the sidelink SR may trigger the sidelink grant from the network entity 705. In some aspects, the sidelink BSR may include an indication of the preferred number of transmission occasions (e.g., m) determined for the sidelink TB. In some aspects, the sidelink BSR may include an indication of one or more other preferred multi-occasion parameter values (e.g., m for the number of multiple occasions and the associated tx_gap in time or tx_offset in frequency, n for the number of multiple feedback occasions and the associated fd_gap in time or fd_offset in frequency). In some aspects, the sidelink BSR may also include channel information (e.g., CBR, RSRP, and/or RSRQ), and LBT information (e.g., the LBT success or failure rate for the first UE 120-1), As shown by reference number 755, the network entity 705 may determine an allocation of resources for one or more transmissions of the sidelink TB in the unlicensed spectrum with multiple transmission occasions for each allocated transmission. For example, the allocated resources may include resources allocated for an initial transmission of the sidelink TB and resources for one or more retransmission reservations for retransmitting the sidelink TB. In this case, the network entity 705 may determine an allocation of resources with multiple transmission occasions for each of the initial transmission and the one or more retransmission reservations. In some aspects, the network entity 705 may determine the allocation of resources with the multiple transmission occasions for each allocated transmission for transmitting the sidelink TB based at least in part on the sidelink BSR received from the first UE 120-1. For example, the network entity 705 may determine whether or not to use the preferred number of transmission occasions indicated in the sidelink BSR based at least in part on the availability of the sidelink resources, the size of the sidelink data to be transmitted, channel information (e.g., CBR, RSRP, and/or RSRQ), and LBT information (e.g., the LBT success or failure rate for the first UE 120-1), among other examples. In some aspects, the network entity 705 may also determine the allocation of multiple feedback occasions for transmitting the sidelink feedback associated with each transmission of the sidelink TB.

As shown by reference number 760, the network entity 705 may transmit, to the first UE 120-1, DCI including a sidelink grant with a multi-occasion indication. The first UE 120-1 may receive the DCI transmitted by the network entity 705. For example, the network entity 705 may transmit the DCI in a PDCCH communication in a licensed spectrum. The DCI may indicate the allocation of resources for the one or more transmissions of a sidelink communication (e.g., the sidelink TB) in the unlicensed spectrum. For example, the DCI may indicate allocation of a resource for an initial transmission of the sidelink TB in the unlicensed spectrum and one or more resources respectively for one or more retransmission reservations for retransmitting the sidelink TB in the unlicensed spectrum (as illustrated in FIG. 6).

In some aspects, the DCI may include a multi-occasion indication that indicates multiple transmission occasions for each of the transmissions of the sidelink TB for which resources are allocated in the DCI. In some aspects, the multiple transmission occasions for each transmission of the sidelink TB may include a plurality of transmission occasions at different times (e.g., at different slots or mini-slots). In this case, the multi-occasion indication included in the DCI may indicate a time and frequency resource for a first transmission occasion for each transmission of the sidelink TB, the time gap (e.g., tx_gap=0, 1, 2, . . . slots/mini-slots) between consecutive transmission occasions of the multiple transmission occasions, and the number of transmission occasions (e.g., m transmission occasions) for each transmission of the sidelink TB (for the initial transmission and each retransmission reservation). In some aspects, the time gap (e.g., tx_gap value) between consecutive transmission occasions of the multiple transmission occasions and the number of transmission occasions (e.g., m value) for each transmission of the sidelink TB may be dynamically indicated in DCI. In some aspects, the time gap (e.g., tx_gap value) between consecutive transmission occasions of the multiple transmission occasions and the number of transmission occasions (e.g., m value) for each transmission of the sidelink TB may be activated via MAC CE (e.g., as described for reference number 730 and/or 734), or configured via RRC (e.g., as described for reference number 710 and/or 714). In this case, only the first occasion of multiple occasions for one or multiple transmissions (e.g., initial transmission and/or retransmissions) is dynamically indicated in DCI, e.g., a first resource for the first occasion of a first transmission, a second resource for the first occasion of a second transmission, and/or a third resource for the first occasion of a third transmission.

In some aspects, the multiple transmission occasions for each transmission of the sidelink TB may include a plurality of transmission occasions at different frequencies (e.g., in different LBT sub-bands). In this case, the multi-occasion indication included in the DCI may indicate a time and frequency resource for a first transmission occasion for each transmission of the sidelink TB, the frequency offset between adjacent transmission occasions of the multiple transmission occasions, and the number of transmission occasions (e.g., m transmission occasions) for each transmission of the sidelink TB (for the initial transmission and each retransmission reservation). In some aspects, the time gap (e.g., tx_gap value) between consecutive transmission occasions of the multiple transmission occasions and the number of transmission occasions (e.g., m value) for each transmission of the sidelink TB may be dynamically indicated in DCI. In some aspects, the frequency offset (e.g., tx_offset value) between consecutive transmission occasions of the multiple transmission occasions and the number of transmission occasions (e.g., m value) for each transmission of the sidelink TB may be activated via MAC CE (e.g., as described for reference number 730 and/or 734), or configured via RRC (e.g., as described for reference number 710 and/or 714). In this case, only the first occasion of multiple occasions for one or multiple transmissions (e.g., initial transmission and/or retransmissions) is dynamically indicated in DCI, e.g., a first resource for the first occasion of a first transmission, a second resource for the first occasion of a second transmission, and/or a third resource for the first occasion of a third transmission.

Similarly, the SCI part 1 (e.g., on PSCCH) associated with the first transmission of the sidelink communication in unlicensed spectrum may contain a first resource for the first occasion of a first transmission, a second resource for the first occasion of a second transmission, and/or a third resource for the first occasion of a third transmission, wherein the multi-occasion parameters (e.g., m for the number of multiple occasions and the associated tx_gap in time or tx_offset in frequency) may be dynamically indicated in SCI part 1 (e.g. on PSCCH) or SCI part 2 (e.g., multiplexed with PSSCH) or activated via MAC CE (e.g., as described for reference number 730 and/or 734) or configured via RRC (e.g., as described for reference number 710 and/or 714).

In some aspects, the multiple transmission occasions for each transmission of the sidelink TB may include transmission occasions at different times (e.g., at different slots or mini-slots) and transmission occasions at different frequencies (e.g., in different LBT sub-bands). In this case, the multi-occasion indication may indicate a time and frequency resource for a first transmission occasion for each transmission of the sidelink TB in SCI part 1 (e.g. on PSCCH), where the time gap between consecutive transmission occasions in time, and the frequency offset between adjacent transmission occasions in the frequency domain (e.g., at each slot or mini-slot indicated by the time gap) may be dynamically indicated in SCI part 1 (e.g. on PSCCH) or SCI part 2 (e.g., multiplexed with PSSCH) or activated via MAC CE (e.g., as described for reference number 730 and/or 734) or configured via RRC (e.g., as described for reference number 710 and/or 714).

In some aspects, the multi-occasion indication may indicate multiple feedback occasions for sidelink feedback associated with each allocated transmission for the sidelink TB in the unlicensed spectrum. In some aspects, the multiple feedback occasions for the sidelink feedback associated with each allocated transmission of the sidelink TB may include a plurality of feedback occasions at different times (e.g., at different slots or mini-slots). In this case, a first feedback occasion for sidelink feedback associated with a transmission of the sidelink TB may be a first PSFCH resource in a resource pool that meets a minimum HARQ processing time from a last transmission occasion for the transmission of the sidelink TB, and the multi-occasion indication included in the DCI may indicate the time gap (e.g. fd_gap) between consecutive feedback occasions of the multiple feedback occasions and the number of feedback occasions (e.g., n) for the sidelink feedback for each allocated transmission of the sidelink TB. In some aspects, the time gap (e.g. fd_gap) between consecutive feedback occasions of the multiple feedback occasions and the number of feedback occasions (e.g., n) for the sidelink feedback for each allocated transmission of the sidelink TB may be activated via MAC CE (e.g., as described for reference number 730 and/or 734), or configured via RRC (e.g., as described for reference number 710 and/or 714). In some aspects, the time gap (e.g. fd_gap) between consecutive feedback occasions of the multiple feedback occasions and the number of feedback occasions (e.g., n) for the sidelink feedback for each allocated transmission of the sidelink TB may be implicitly indicated by the indication of a resource pool in DCI, e.g., the feedback resource allocation in a selected resources pool defines the time gap (e.g. fd_gap) and the number of feedback occasions (e.g., n).

In some aspects, the multiple feedback occasions for sidelink feedback associated with each allocated transmission of the sidelink TB may include a plurality of feedback occasions at different frequencies (e.g., in different LBT sub-bands). In this case, a first feedback occasion (e.g., in a first sub-band) for sidelink feedback associated with a transmission of the sidelink TB may be a first PSFCH resource in a resource pool that meets a minimum HARQ processing time from a last transmission occasion for the transmission of the sidelink TB, and the multi-occasion indication included in the DCI may indicate the frequency offset (e.g. fd_offset) between adjacent feedback occasions of the multiple feedback occasions and the number of feedback occasions (e.g., m) for the sidelink feedback for each allocated transmission of the sidelink TB. In some aspects, the frequency offset (e.g. fd_offset) between consecutive feedback occasions of the multiple feedback occasions and the number of feedback occasions (e.g., n) for the sidelink feedback for each allocated transmission of the sidelink TB may be activated via MAC CE (e.g., as described for reference number 730 and/or 734), or configured via RRC (e.g., as described for reference number 710 and/or 714). In some aspects, the frequency offset (e.g. fd_offset) between consecutive feedback occasions of the multiple feedback occasions and the number of feedback occasions (e.g., n) for the sidelink feedback for each allocated transmission of the sidelink TB may be implicitly indicated by the indication of a resource pool in DCI, e.g., the feedback resource allocation in a selected resources pool defines the frequency offset (e.g. fd_offset) and the number of feedback occasions (e.g., n).

In some aspects, the multiple feedback occasions for sidelink feedback associated with each allocated transmission of the sidelink TB may include feedback occasions at different times (e.g., at different symbols or slots or mini-slots) and feedback occasions at different frequencies (e.g., in different LBT sub-bands). In this case, the multi-occasion configuration may include an indication of the time gap (e.g. fd_gap) between consecutive feedback occasions in time and an indication of the frequency offset (e.g. fd_offset) between adjacent feedback occasions in the frequency domain (e.g., at each slot or mini-slot indicated by the time gap). In some aspects, the time gap (e.g. fd_gap) between consecutive feedback occasions in time and the frequency offset (e.g. fd_offset) between adjacent feedback occasions in the frequency domain may be activated via MAC CE (e.g., as described for reference number 730 and/or 734), or configured via RRC (e.g., as described for reference number 710 and/or 714). In some aspects, the time gap (e.g. fd_gap) between consecutive feedback occasions in time and the frequency offset (e.g. fd_offset) between adjacent feedback occasions in the frequency domain may be implicitly indicated by the indication of a resource pool in DCI, e.g., the feedback resource allocation in a selected resources pool defines the time gap (e.g. fd_gap) and the frequency offset (e.g. fd_offset), as well as the number of feedback occasions (e.g., n).

In some aspects, the DCI may indicate an uplink resource (e.g., a PUCCH resource) to be used by the first UE 120-1 for transmitting, to the network entity 705, ACK/NACK feedback for the one or more transmissions of the sidelink TB. For example, a PSFCH-to-HARQ timing indicator included in the DCI may indicate a time gap between a last feedback occasion for sidelink feedback associated with a final allocated transmission for the sidelink TB and the uplink resource (e.g., a PUCCH resource) for transmitting the ACK/NACK feedback to the network entity 705. In some aspects, the DCI may indicate an uplink resource (e.g., a PUCCH resource) for ACK-only feedback after the last feedback occasion associated with each non-final allocated transmission for the sidelink TB, and the DCI may indicate an uplink resource for ACK/NACK feedback after the last feedback occasion associated with the final allocated transmission for the sidelink TB. For example, in a case in which the DCI indicates that resources are allocated for an initial transmission of the sidelink TB, a first retransmission reservation for retransmitting the sidelink TB, and a second retransmission reservation for retransmitting the sidelink TB, the DCI may indicate a an uplink resource for transmitting ACK-only feedback to the network entity 705 after the last feedback occasion associated with the initial transmission of the sidelink TB, an uplink resource for transmitting ACK-only feedback to the network entity 705 after the last feedback occasion associated with the first retransmission reservation for the sidelink TB, and an uplink resource for transmitting ACK/NACK feedback to the network entity 705 after the last feedback occasion associated with the second retransmission reservation (e.g., the final allocated transmission) for the sidelink TB. If an ACK received on ACK-only PUCCH, the resources for multi-occasions of the transmission allocated after the ACK may be canceled for this TB transmission. If a NACK received on the PUCCH after the last feedback occasion associated with the second retransmission reservation (e.g., the final allocated transmission), a new grant with multi-occasions for one or more transmissions for this TB may be indicated in a second DCI (e.g., DCI 2 as shown in FIG. 6).

As shown by reference number 765, the first UE 120-1 may perform an LBT procedure (e.g., Cat4 or CAT2 LBT) for one or more of the transmission occasions for the initial transmission of the sidelink communication (e.g., the sidelink TB). The first UE 120-1 may select a transmission occasion for transmitting the initial transmission of the sidelink TB, from the multiple transmission occasions for the initial transmission of the sidelink TB, based at least in part on the performing the LBT procedure for one or more of the transmission occasions for the initial transmission of the sidelink TB. For example, the first UE 120-1 may select, from the multiple transmission occasions for the initial transmission of the sidelink TB, a transmission occasion for which the LBT procedure is successful.

In some aspects, in a case in which the multiple transmission occasions for the initial transmission of the sidelink TB are at different times (e.g., in different slots or min-slots), the first UE 120-1 may begin with the first transmission occasion in time and sequentially perform the LBT procedure for each consecutive transmission occasion until the LBT procedure is successful for a transmission occasion. In this case, the first UE 120-1 may select the first transmission occasion for which the LBT procedure is successful to use to transmit the first transmission of the sidelink TB.

In some aspects, in a case in which the multiple transmission occasions for the initial transmission of the sidelink TB are at different frequencies and at the same time (e.g., in the same slot or mini-slot), the first UE 120-1 may perform the LBT procedure for all of the transmission occasions at the different frequencies (e.g., in different LBT sub-bands) in the same slot (or mini-slot). In this case, the first UE 120-1 may select any transmission occasion (e.g., with an LBT sub-band) for which the LBT procedure is successful to use to transmit the first transmission of the sidelink TB.

As shown by reference number 770, the first UE 120-1 may transmit a sidelink communication (e.g., including the sidelink TB) to one or more second UEs 120-2 in the selected transmission occasion of the multiple transmission occasions for the initial transmission of the sidelink TB. The selected transmission occasion may be a transmission occasion, of the multiple transmission occasions for the initial transmission of the sidelink TB, for which the LBT performed by the first UE 120-1 is successful. The one or more second UEs 120-2 may monitor all transmission occasions for the initial transmission and receive the sidelink communication (e.g., including the sidelink TB) transmitted, by the first UE 120-1, in one transmission occasion of the multiple transmission occasions monitored. In some aspects, the sidelink communication transmitting by the first UE 120-1 may include the sidelink TB and SCI that indicates the resource allocation and the multi-occasion indication included in the DCI.

As shown by reference number 775A, the first UE 120-1, in connection with transmitting the initial transmission of the sidelink communication (e.g., including the sidelink TB) may start a sidelink inactivity timer of the first UE 120-1. In some aspects, the first UE 120-1 may start the sidelink inactivity timer after the slot in which the sidelink communication is transmitted in the selected transmission occasion, and a duration of the sidelink activity timer may include all of the multiple feedback occasions for the sidelink feedback associated with the initial transmission of the sidelink TB. As shown by reference number 775B, each second UE 120-2 that receives the initial transmission of the sidelink communication (e.g., including the sidelink TB) from the first UE 120-1 may start the sidelink inactivity timer for the second UE 120-2 in connection with receiving the initial transmission of the sidelink communication and a duration of the sidelink activity timer may include all of the multiple feedback occasions for the sidelink feedback associated with the initial transmission of the sidelink TB. In some aspects, the first UE 120-1 and each second UE 120-2 may start the sidelink inactivity timer after the slot in which the sidelink communication is transmitted or received respectively, in a transmission occasion, and the duration of the sidelink activity timer may include all of the multiple feedback occasions for the sidelink feedback associated with the initial transmission of the sidelink TB (e.g., as indicated in the SCI included in the initial transmission of the sidelink communication). In this way, the first UE 120-1 (e.g., the Tx UE) and the second UEs 120-2 (e.g., the Rx UEs) may synchronize active states for sidelink feedback transmissions in the sidelink feedback occasions associated with the initial transmission of the sidelink TB.

As shown by reference number 780, each second UE 120-2 that receives the initial transmission of the sidelink communication (e.g., including the sidelink TB) from the first UE 120-1 may perform an LBT procedure (e.g., Cat4 or CAT2 LBT) for one or more feedback occasions of the multiple feedback occasions for the sidelink feedback associated with the initial transmission of the sidelink TB. A second UE 120-2 may select a feedback occasion for transmitting the sidelink feedback (e.g., HARQ ACK/NACK feedback) for the initial transmission of the sidelink TB, from the multiple feedback occasions for the sidelink feedback associated with the initial transmission of the sidelink TB, based at least in part on the performing the LBT procedure for one or more of the feedback occasions for the sidelink feedback associated with the initial transmission of the sidelink TB. For example, the second UE 120-2 may select, from the multiple feedback occasions for the sidelink feedback associated with the initial transmission of the sidelink TB, a feedback occasion for which the LBT procedure is successful.

In some aspects, in a case in which the multiple feedback occasions for the sidelink feedback associated with the initial transmission of the sidelink TB are at different times (e.g., in different symbols or slots or min-slots), the second UE 120-2 may begin with the first feedback occasion in time and sequentially perform the LBT procedure for each consecutive feedback occasion until the LBT procedure is successful for a feedback occasion. In this case, the second UE 120-2 may select the first feedback occasion for which the LBT procedure is successful to use to transmit the sidelink feedback (e.g., HARQ ACK/NACK feedback) for the initial transmission of the sidelink TB.

In some aspects, in a case in which the multiple feedback occasions for the sidelink feedback associated with the initial transmission of the sidelink TB are at different frequencies and at the same time (e.g., in the same symbol or slot or mini-slot), the second UE 120-2 may perform the LBT procedure for all of the feedback occasions at the different frequencies (e.g., in different LBT sub-bands) in the same slot (or mini-slot). In this case, the second UE 120-2 may select any feedback occasion (e.g., within an LBT sub-band) for which the LBT procedure is successful to use to transmit the sidelink feedback (e.g., ACK/NACK feedback) for the initial transmission of the sidelink TB. The one or more second UEs 120-2 may monitor all transmission occasions (e.g., in different LBT sub-bands) in the same slot (or mini-slot) for the initial transmission and receive the sidelink communication (e.g., including the sidelink TB) transmitted, by the first UE 120-1, in one transmission occasion (e.g., a LBT sub-band with successful LBT) of the multiple transmission occasions monitored.

Each second UE 120-2 may transmit respective sidelink feedback (e.g., HARQ ACK/NACK feedback) for the initial transmission sidelink TB to the first UE 120-1 in the feedback occasion selected by that second UE 120-2 from the multiple feedback occasions for the sidelink feedback associated with the initial transmission of the sidelink TB. The first UE 120-1 may monitor all feedback occasions and receive the sidelink feedback (e.g., HARQ-ACK/NACK feedback) transmitted from the one or more second UEs 120-2 in the respective feedback occasions monitored.

As shown by reference number 785, if the sidelink feedback received by the first UE 120-1 from the one or more second UEs 120-2 results in an ACK (e.g., no retransmission of the sidelink TB is needed), the first UE 120-1 may transmit, to the network entity 705, a PUCCH communication including an indication of the ACK feedback on the uplink resource (e.g., PUCCH resource), as indicated in the DCI or activated via MAC CE or configured via RRC, for ACK-only feedback after the last feedback occasion associated with the initial transmission of the sidelink TB (e.g., a non-final allocated transmission for the sidelink TB). The ACK-only feedback after a non-final allocated transmission provides an indication, to the network entity 705, that the reserved resources for one or more retransmissions of the sidelink TB are not needed by the first UE 120-1, such that the network entity 705 may reuse the reserved resources with the multiple transmission occasions for other sidelink traffic (e.g., other sidelink TBs to be transmitted by the first UE 120-1, a second UE 120-2, or another UE).

As shown by reference number 790A, in the sidelink feedback received by the first UE 120-1 from the one or more second UEs 120-2 results in a NACK (e.g., one or more of the second UEs 120-2 did not successfully decode the sidelink TB transmitted in the initial transmission), the first UE 120-1 may start a HARQ timer. As shown by reference number 790B, if a second UE 120-2 transmits NACK feedback to the first UE 120-1 in the selected feedback occasion associated with the initial transmission of the sidelink TB, the second UE 120-2 may start the HARQ timer. In the case, in which the NACK feedback is transmitted to the first UE 120-1 from a second UE 120-2, the first UE 120-1 and the second UE 120-2 may start respective HARQ round trip time (RTT) timers after receiving the NACK on the PSFCH (e.g., by the first UE 120-1) or transmitting the NACK on the PSFCH (e.g., by the second UE 120-2). The first UE 120-1 and the second UE 120-2 may start respective HARQ retransmission timers after the respective HARQ RTT timers for the first UE 120-1 and the second UE 120-2 expire. The HARQ retransmission timers for the first UE 120-1 and the second UE 120-2 may each have a duration that includes all of the multiple transmission occasions for the first retransmission of the sidelink TB. When the HARQ retransmission timers are running, the first UE 120-1 may transmit the first retransmission of the sidelink TB in a selected transmission occasion of the multiple transmission occasions for the first retransmission (e.g., selected based in part on LBT as described above in connection with reference number 765), and the second UE 120-2 may monitor the transmission occasions for the first retransmission of the sidelink TB and receive the retransmission of the sidelink TB transmitted by the first UE 120-1 in one transmission occasion of the transmission occasions monitored.

In some aspects, the multi-occasion configuration with multiple transmission occasions (e.g., m for the number of multiple occasions and the associated tx_gap in time or tx_offset in frequency) for an allocated transmission (e.g., an initial transmission or retransmission) within the period (e.g., sl-PeriodCG) of a configured grant (e.g., identified by sl-ConfigIndexCG) for a sidelink communication in the unlicensed spectrum may be included in one or multiple configurations for sidelink configured grant type 2. For example, the multi-occasion configuration may be included in configured grant configuration (e.g., SL-ConfiguredGrantConfig for configured grant type 2), where the multiple occasions for a first allocated transmission may be relative to (e.g., the gap in time or offset in frequency) the first occasion of the first allocated transmission activated (e.g., first occasion of the first allocated transmission is activated via DCI with time gap determined by higher layer parameter sl-DCI-ToSL-Trans and lowest index of the subchannel allocation to the initial transmission in frequency) and the multiple occasions for a second or a third allocated transmission may be relative to (e.g., the gap in time or offset in frequency) the first occasion of the second or the third allocated transmission configured (e.g., first occasion of the second or third allocated transmission is activated via DCI with time resource assignment and frequency resource assignment). In some aspects, the parameters for multiple transmission occasions, such as the time gap (e.g., tx_gap value), the frequency offset (e.g., tx_offset value) between consecutive transmission occasions of the multiple transmission occasions and the number of transmission occasions (e.g., m value), for each transmission of sidelink communication in unlicensed spectrum may be activated in the same DCI. In some aspects, the parameters for multiple transmission occasions, such as the time gap (e.g., tx_gap value), the frequency offset (e.g., tx_offset value) between consecutive transmission occasions of the multiple transmission occasions and the number of transmission occasions (e.g., m value), for each transmission of sidelink communication in unlicensed spectrum may be via MAC CE (e.g., as described for reference number 730 and/or 734), or configured via RRC (e.g., as described for reference number 710 and/or 714). In this case, only the first occasion of multiple occasions for one or multiple transmissions (e.g., initial transmission and/or retransmissions) is activated by DCI, e.g., a first resource for the first occasion of a first transmission, a second resource for the first occasion of a second transmission, and/or a third resource for the first occasion of a third transmission.

In some aspects, the multi-occasion configuration with multiple feedback occasions (e.g., n for the number of multiple feedback occasions and the associated fd_gap in time or fd_offset in frequency) for sidelink feedback associated with each allocated transmission (e.g., an initial transmission or retransmission) within the period (e.g., sl-PeriodCG) of a configured grant (e.g., identified by sl-ConfigIndexCG) for a sidelink communication in the unlicensed spectrum may be included in one or multiple configurations for sidelink configured grant type 2. For example, the multi-occasion configuration may be included in configured grant configuration (e.g., SL-Config-uredGrantConfig for configured grant type 2), where the multiple feedback occasions for sidelink feedback associated with each allocated transmission may be based on the feedback resource allocations within a resource pool (e.g., activated via DCI with resource pool index). For example, multiple symbols at the end of a slot may be allocation for multiple feedback occasions associated to one or more transmissions in one or more slots prior to the slot containing feedback resources. For another example, multiple consecutive slots or mini-slots may contain feedback resources for multiple feedback occasions associated to one or more transmissions in one or more slots or mini-slots prior to the slot containing feedback resources. For another example, multiple LBT subbands may contain feedback resources for multiple feedback occasions, at same symbol(s) with same slot(s) or mini-slot(s), associated to one or more transmissions in same or different LBT subbands within one or more slots or mini-slots prior to the slot or mini-slot containing feedback resources. In this case, the gap in time (e.g., fd_gap) or offset in frequency (e.g., fd_offset) for multiple feedback occasions associated to a allocated transmission is implicitly activated or structured in an activated resource pool with feedback resources allocated, where the multiple feedback occasions may be mapped to the feedback resource allocations per the order in time order (e.g., the first occasion is mapped to the first feedback symbol, and second feedback occasion is mapped to the second feedback symbol) or may be mapped to the feedback resource allocations per the order in frequency (e.g., starting from the lowest frequency resource, for example, the first occasion is mapped to the first LBT sub-band, and second feedback occasion is mapped to the second LBT sub-band). Additionally, an ACK-only feedback resource on uplink in licensed spectrum (e.g., ACK-only PUCCH resource) after last transmission occasion for each allocation transmission may be activated with the same DCI (e.g., ACKPSFCH-to-HARQ feedback timing indicator and ARKPUCCH resource indicator indicated in the DCI) or may be activated via MAC CE or configured via RRC (e.g., sl-N1ACKPUCCH-AN-Type2), and an ACK/NACK feedback resource on uplink in licensed spectrum (e.g., ACK/NACK PUCCH resource) after the last feedback occasion associated with the last allocated transmission may be activated with the same DCI (e.g., PSFCH-to-HARQ feedback timing indicator and PUCCH resource indicator indicated in the DCI) or may be activated via MAC CE or configured via RRC (e.g., sl-N1PUCCH-AN-Type2). In some aspects, the PUCCH resource indication for ACK-only may be the same as the PUCCH resource indication if only PUCCH resource indicator is activated in the DCI (e.g., ARKPUCCH resource indicator is not indicated).

As indicated above, FIG. 7 is provided as an example. Other examples may differ from what is described with respect to FIG. 7.

Figure 8:
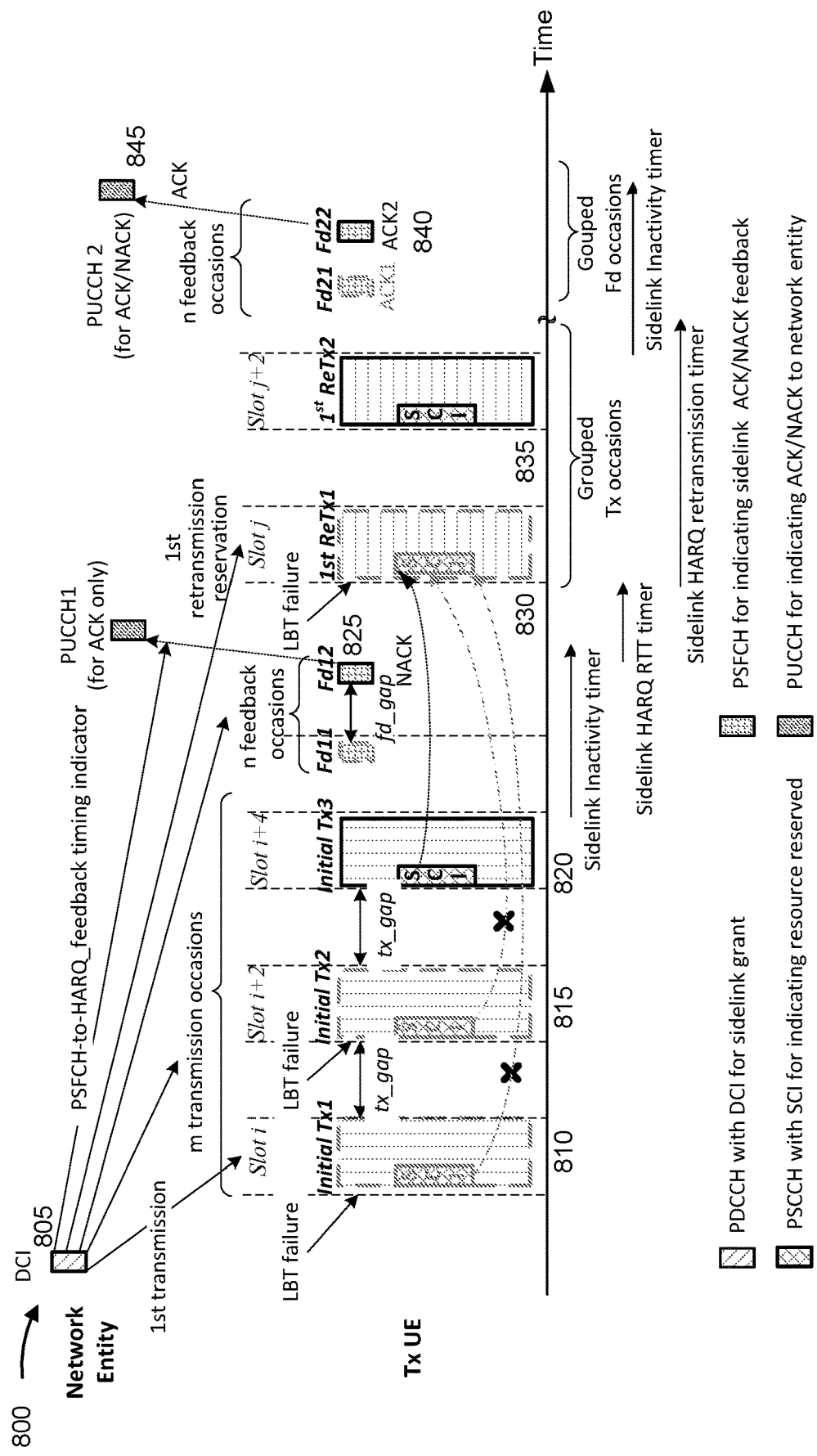

FIG. 8 is a diagram illustrating an example 800 associated with resource allocation for unlicensed spectrum sidelink communications, in accordance with the present disclosure. As shown in FIG. 8, example 800 shows an example of sidelink communications in an unlicensed spectrum using Mode 1 resource allocation (e.g., dynamic grant in mode 1) with multiple transmission occasions, in the time domain, for each transmission allocated in a sidelink grant and multiple feedback occasions for sidelink feedback associated with each transmission allocated in the sidelink grant.

As shown in FIG. 8, and by reference number 805, a network entity (e.g., network entity 705, base station 110, CU 310, DU 330, RU 340, or a combination thereof) may transmit (e.g., in a PDCCH communication) DCI including a sidelink grant to a Tx UE. The DCI may indicate resources allocated for an initial transmission (e.g., a first transmission) of a sidelink communication (e.g., a sidelink TB) in an unlicensed spectrum by the Tx UE and resources allocated for a first retransmission reservation (e.g., a second transmission) for retransmitting the sidelink communication (e.g., the sidelink TB) in the unlicensed spectrum.

As shown in FIG. 8, the DCI may indicate multiple transmissions occasions (e.g., m transmission occasions) at different times (e.g., in different slots or mini-slots) for each of the initial transmission and the first retransmission reservation for the sidelink communication. The DCI may indicate a resource in time and frequency for a first transmission occasion, for each allocated transmission of the sidelink communication. For example, the DCI may indicate that the first transmission occasion (e.g., Initial Tx1 as shown by reference number 810) for the initial transmission is in slot i and the first transmission occasion (e.g., $1^{st}$ ReTx1 as shown by reference number 830) for the first retransmission reservation is in slot j. The DCI may indicate a time gap (e.g., tx_gap) between the consecutive transmission occasions for each of the initial transmission and the first retransmission. For example, as shown in FIG. 8, the DCI may indicate a time gap of tx_gap=2 slots between the consecutive transmission occasions, such that the second transmission occasion (e.g., Initial Tx2 as shown by reference number 815) for the initial transmission is in slot i+2 and the third transmission occasion (e.g., Initial Tx3 as shown by reference number 820) for the initial transmission is in slot i+4. The DCI may also indicate the number of transmission occasions (e.g., m transmission occasions) for the initial transmission and each allocated retransmission. In this way, the DCI may indicate a grouped transmission occasions or a set of transmission occasions for each allocation transmission (e.g., the initial transmission and the first retransmission) in the unlicensed spectrum.

As further shown in FIG. 8, the DCI may indicate feedback transmissions occasions (e.g., n transmission occasions) at different times (e.g., in different symbols or slots or mini-slots) for sidelink feedback associated with each of the initial transmission and the first retransmission reservation for the sidelink communication. For example, the DCI may indicate a grouped feedback occasions or a set of feedback occasions after each transmission allocation (e.g., the initial transmission and the first retransmission). The first feedback occasion in each grouped feedback occasions or a set of feedback occasions (e.g., Fd11 and Fd21) may be a first PSFCH resource (e.g., Fd11) in a resource pool that meets the minimum HARQ processing time (e.g., from the last transmission occasion in the previous allocated transmission, such as Initial Tx3, to the first feedback occasion, such as Fd11). The DCI may indicate a time gap (fd_gap) (e.g., fd_gap=0, 1, . . . symbols or slots or mini-slots) between the consecutive feedback occasions in each grouped feedback occasions or set of feedback occasions (e.g., the time gap fd_gap between Fd11 and Fd12). The DCI may also indicate the number of feedback occasions (e.g., n=2 feedback occasions as shown) for the sidelink feedback associated with each of the initial transmission and each allocated retransmission.

As shown in FIG. 8, in some aspects, the DCI may indicate a first PUCCH resource (PUCCH1) after a non-final allocated transmission of the sidelink communication (e.g., the initial transmission) to be used by the Tx UE for transmitting ACK-only feedback to the network entity. For example, the DCI may include a ACKPSFCH-to-HARQ feedback timing indicator that indicates a time gap between a last feedback occasion (e.g., FD12 as shown by reference number 825) associated with a non-final allocated transmission of the sidelink communication (e.g., the initial transmission) and PUCCH1. The DCI may indicated a second PUCCH resource (PUCCH2) after a final allocated transmission (e.g., the first retransmission reservation in FIG. 8) to be used by the Tx UE for transmitting ACK/NACK feedback to the network entity. For example, the DCI may include a PSFCH-to-HARQ feedback timing indicator that indicates a time gap between a last feedback occasion (e.g., Fd22 as shown by reference number 840) associated with the final allocated transmission of the sidelink communication (e.g., the first retransmission reservation) and PUCCH2. In some aspects, the same PSFCH-to-HARQ feedback timing indicator may be used to indicate PUCCH1 and PUCCH2. In some aspects, different PSFCH-to-HARQ feedback timing indicators may be used to indicate PUCCH1 (e.g., ACKPSFCH-to-HARQ feedback timing indicator) and PUCCH2 (e.g., PSFCH-to-HARQ feedback timing indicator).

As shown by reference number 810, the Tx UE may perform an LBT procedure, and detect an LBT failure, for the first transmission occasion (e.g., Initial Tx1) for the initial transmission of the sidelink communication. As shown by reference number 815, the Tx UE may then perform the LBT procedure, an detect an LBT failure, for the second transmission occasion (e.g., Initial Tx2) for the initial transmission of the sidelink communication. As shown by reference number 820, the Tx UE may perform the LBT procedure, and detect LBT success for the third transmission occasion (e.g., Initial Tx3) for the initial transmission of the sidelink communication, and the Tx UE may transmit the initial transmission of the sidelink communication to an Rx UE in the third transmission occasion (Initial Tx3) for the initial transmission. The sidelink communication may include a sidelink TB and SCI, where the SCI (e.g., SCI part 1 or SCI part 2) may include the multi-occasion information indicated in the DCI.

The Tx UE may start its sidelink inactivity timer after the slot (e.g., slot i+4) in which the sidelink communication is transmitted in the selected transmission occasion (e.g., Initial Tx3). The duration of the sidelink inactivity timer may include all of feedback occasions (e.g., Fd11 and Fd12) for the sidelink feedback for the initial transmission of the sidelink communication, and the Tx UE may remain active and monitor for the sidelink feedback in the feedback occasions when the sidelink inactivity timer is running. As shown by reference number 825, the Tx UE may receive, from the Rx UE, sidelink feedback in the second feedback occasion (e.g., Fd12 as shown by reference number 825) for the sidelink feedback associated with the initial transmission of the sidelink communication. For example, the Tx UE may receive a NACK feedback from the Rx UE in the second feedback occasion (e.g., Fd12) after the initial transmission of the sidelink communication. In this case, the Tx UE may not transmit any feedback on PUCCH1, which is for transmitting ACK-only feedback to the network entity. For another example, the Tx UE may receive an ACK feedback from the Rx UE in the second feedback occasion (e.g., Fd12) after the initial transmission of the sidelink communication. In this case, the Tx UE may transmit an ACK feedback on PUCCH1, and the resources reserved with multi-occasions (e.g., $1^{st}$ ReTx1 and $1^{st}$ ReTx2) may be release for other sidelink transmissions.

The Tx UE may stop its sidelink inactivity timer if still running and start its sidelink HARQ RTT timer after receiving the NACK feedback from the Rx UE, and the Tx UE may start its sidelink HARQ retransmission timer after the expiration of the sidelink HARQ RTT timer. The duration of the sidelink HARQ retransmission time may include all of the transmission occasions (e.g., $1^{st}$ ReTx1 and $1^{st}$ ReTx2) for the next transmission (e.g., the first retransmission) of the sidelink communication. While the sidelink HARQ retransmission timer is running, as shown by reference number 830, the Tx UE may perform the LBT procedure, and detect LBT failure, for the first transmission occasion (e.g., $1^{st}$ ReTx1) for the first retransmission of the sidelink communication; and as shown by reference number 835, the Tx UE may perform the LBT procedure, and detect LBT success, for the second transmission occasion (e.g., $1^{st}$ ReTx2) for the first retransmission of the sidelink communication, and the Tx UE may transmit the first retransmission (e.g., the second transmission) of the sidelink communication to the Rx UE, in slot j+2, in the second transmission occasion (e.g., $1^{st}$ ReTx2 as shown by reference number 835) for the first retransmission. The Tx UE may stop its sidelink HARQ retransmission timer if still running and start its sidelink inactivity timer after transmitting the first retransmission in the second transmission occasion (e.g., $1^{st}$ ReTx2 as shown by reference number 835) for the first retransmission.

The Rx UE may start its sidelink HARQ RTT timer after transmitting the NACK feedback to the Tx UE, and the Rx UE may start its sidelink HARQ retransmission timer after the expiration of the sidelink HARQ RTT timer. The duration of the sidelink HARQ retransmission time may include all of the transmission occasions (e.g., $1^{st}$ ReTx1 and $1^{st}$ ReTx2) for the next transmission (e.g., the first retransmission) of the sidelink communication. While the sidelink HARQ retransmission timer is running, the Rx UE may monitor all transmission occasions (e.g., $1^{st}$ ReTx1 and $1^{st}$ ReTx2) for the first retransmission and receive the first retransmission in the second transmission occasion (e.g., $1^{st}$ ReTx2 as shown by reference number 835). The Rx UE may stop its HARQ retransmission timer if still running and start its sidelink inactivity timer after receiving the first retransmission in the second transmission occasion (e.g., $1^{st}$ ReTx2 as shown by reference number 835) for the first retransmission.

The Tx UE may monitor for the sidelink feedback in the feedback occasions (e.g., Fd21 and Fd22) for the sidelink feedback associated with the first retransmission while its sidelink inactivity timer, covering all the feedback occasions (e.g., Fd21 and Fd22), is running. As shown by reference number 840, the Tx UE may receive, from the Rx UE, sidelink feedback in the second feedback occasion (e.g., Fd22) for the sidelink feedback associated with the first retransmission of the sidelink communication. For example, the Tx UE may receive an ACK feedback from the Rx UE in the second feedback occasion (e.g., Fd22) after the first retransmission of the sidelink communication. As shown by reference number 845, the Tx UE may transmit an indication of the ACK feedback to the network entity in PUCCH2.

As indicated above, FIG. 8 is provided as an example. Other examples may differ from what is described with respect to FIG. 8.

Figure 9:
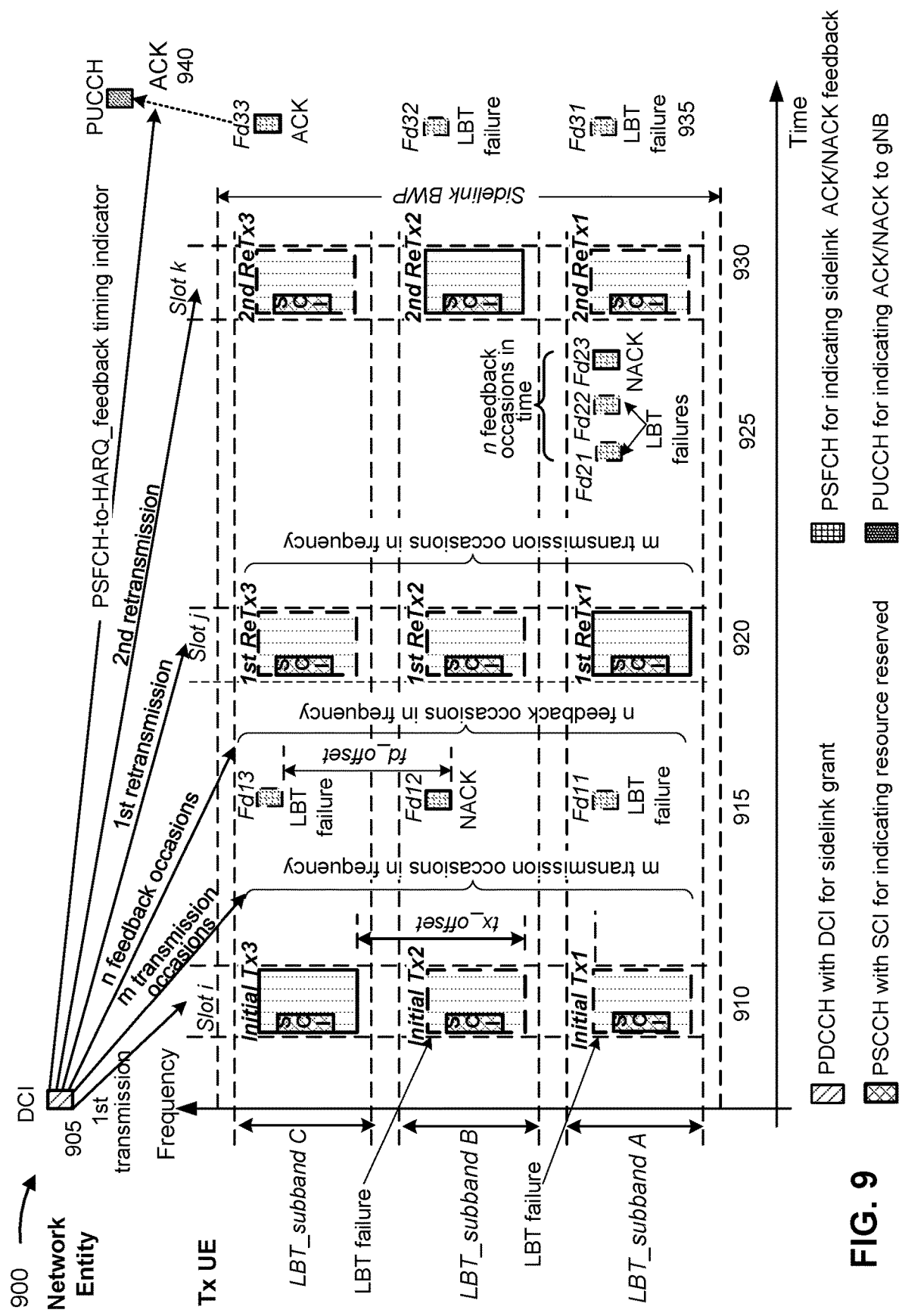

FIG. 9 is a diagram illustrating an example 900 associated with resource allocation for unlicensed spectrum sidelink communications, in accordance with the present disclosure. As shown in FIG. 9, example 900 shows an example of sidelink communications in an unlicensed spectrum using Mode 1 resource allocation with multiple transmission occasions, in the frequency domain, for each transmission allocated in a sidelink grant and multiple feedback occasions for sidelink feedback associated with each transmission allocated in the sidelink grant.

As shown in FIG. 9, and by reference number 905, a network entity (e.g., network entity 705, base station 110, CU 310, DU 330, RU 340, or a combination thereof) may transmit (e.g., in a PDCCH communication) DCI including a sidelink grant to a Tx UE. The DCI may indicate resources allocated for an initial transmission (e.g., a first transmission) of a sidelink communication (e.g., a sidelink TB) in an unlicensed spectrum by the Tx UE, resources allocated for a first retransmission reservation for a first retransmission (or second transmission) of the sidelink communication (e.g., the sidelink TB) in the unlicensed spectrum, and resources allocated for a second retransmission reservation for a second retransmission (or third transmission) of the sidelink communication (e.g., the sidelink TB) in the unlicensed spectrum.

As shown in FIG. 9, a sidelink BWP may include multiple LBT sub-bands (e.g., LBT_subband A, LBT_subband B, and LBT_subband C). The DCI may indicate multiple transmissions occasions (e.g., m transmission occasions) at different frequencies (e.g., in different LBT sub-bands) for each of the initial transmission, the first retransmission reservation, and the second retransmission reservation for the sidelink communication. The DCI may indicate a resource in time and frequency for a first transmission occasion, for each allocated transmission of the sidelink communication. For example, the DCI may indicate that the first transmission occasion (e.g., Initial Tx1) for the initial transmission is in slot i and LBT_subband A, the first transmission occasion (e.g., $1^{st}$ ReTx1) for the first retransmission reservation is in slot j and LBT_subband A, and the first transmission occasion (e.g., $2^{nd}$ ReTx1) for the second retransmission reservation is in slot k and LBT_subband A. The DCI may indicate a frequency offset (e.g., tx_offset) between the starting frequencies of adjacent transmission occasions for the initial transmission and each retransmission reservation. The DCI may also indicate the number of transmission occasions (e.g., m transmission occasions) for the initial transmission and each allocated retransmission.

As further shown in FIG. 9, in some aspects, the DCI may indicate feedback transmissions occasions (e.g., n transmission occasions) at different frequencies (e.g., in different LBT sub-bands) for sidelink feedback associated with each of one or more allocated transmissions (e.g., the initial transmission, the first retransmission, and/or the second retransmission) of the sidelink communication in the unlicensed spectrum. For example, in FIG. 9, the feedback occasions (e.g., Fd11, Fd12, and Fd13) for sidelink feedback associated with the initial transmission are at different frequencies and the feedback occasions (e.g., Fd31, Fd32, and Fd33) for sidelink feedback associated with the second retransmission are at different frequencies. In some aspects, as shown by the feedback occasions (e.g., Fd21, Fd22, and Fd23) for sidelink feedback associated with the first retransmission, multiple feedback occasions at different times may be used together with multiple transmission occasions with different frequencies (or vice versa). The first feedback occasion in each set of feedback occasions (e.g., Fd11, Fd21, and Fd31) may be a first PSFCH resource (e.g., in LBT_subband A) in a resource pool that meets the minimum HARQ processing time (e.g., from the last transmission occasion in the previous allocated transmission to the first feedback occasion). In a case in which the feedback occasions for sidelink feedback associated with an allocated transmission are at different frequencies, the DCI may indicate a frequency offset (e.g., fd_offset) between the starting frequencies of adjacent feedback occasions in each set of feedback occasions. The DCI may also indicate the number of feedback occasions (e.g., n feedback occasions) for the sidelink feedback associated with each of the initial transmission and each allocated retransmission.

As shown in FIG. 9, in some aspects, the DCI may indicate a PUCCH resource after the final allocated transmission of the sidelink communication (e.g., the second retransmission reservation in FIG. 9) to be used by the Tx UE for transmitting ACK/NACK feedback to the network entity. For example, the DCI may include a PSFCH-to-HARQ feedback timing indicator that indicates a time gap between a last feedback occasion associated with the final allocated transmission of the sidelink communication (e.g., the second retransmission reservation) and the PUCCH resource.

As shown by reference number 910, the Tx UE may perform an LBT procedure for each of the transmission occasions (e.g., Initial Tx1, Initial Tx2, and Initial Tx3) for the initial transmission. For example, the Tx UE may detect LBT failure in the first transmission occasion (e.g., Initial Tx1) in LBT_subband A, the Tx UE may detect LBT failure in the second transmission occasion (e.g., Initial Tx2) in LBT_subband B, and the Tx UE may detect LBT success in the third transmission occasion (e.g., Initial Tx3) in LBT_subband C. In this case, the Tx UE may transmit the initial transmission of the sidelink communication to an Rx UE in the third transmission occasion (e.g., Initial Tx3) for the initial transmission. The sidelink communication may include a sidelink TB and SCI, which may include the information indicated in the DCI.

The Tx UE may monitor for the sidelink feedback in the multiple feedback occasions (e.g., Fd11, Fd12, and Fd13) for sidelink feedback associated with the initial transmission. As shown by reference number 915, the Tx UE may receive, from the Rx UE, sidelink feedback in the second feedback occasion (e.g., Fd12) for the sidelink feedback associated with the initial transmission of the sidelink communication, in connection with the Rx UE detecting LBT success in the second feedback occasion (e.g., Fd12) and detecting LBT failure in the first feedback occasion (e.g., Fd11) and the third feedback occasion (e.g., Fd13) for the sidelink feedback associated with the initial transmission. For example, the Tx UE may receive NACK feedback from the Rx UE in the second feedback occasion (e.g., Fd12) after the initial transmission of the sidelink communication.

As shown by reference number 920, the Tx UE may transmit the first retransmission of the sidelink communication in the first transmission occasion (e.g., $1^{st}$ ReTx1) for the first retransmission of the sidelink communication. For example, the Tx UE may select the first transmission occasion (e.g., $1^{st}$ ReTx1) based at least in part on performing the LBT procedure for the first transmission occasion (e.g., $1^{st}$ ReTx1), the second transmission occasion (e.g., $1^{st}$ ReTx2), and the third transmission occasion (e.g., $1^{st}$ ReTx3) for the first retransmission of the sidelink communication.

The Tx UE may monitor for the sidelink feedback in the multiple feedback occasions (e.g., Fd21, Fd22, and Fd23) for the sidelink feedback associated with the first retransmission of the sidelink communication. As shown by reference number 925, the Tx UE may receive, from the Rx UE, sidelink feedback in the third feedback occasion (e.g., Fd23) for the sidelink feedback associated with the first retransmission of the sidelink communication, in connection with the Rx UE detecting LBT success in the third feedback occasion (e.g., Fd23) and detecting LBT failure in the first feedback occasion (e.g., Fd21) and the second feedback occasion (e.g., Fd22) for the sidelink feedback associated with the first retransmission of the sidelink communication. For example, the Tx UE may receive NACK feedback from the Rx UE in the third feedback occasion (e.g., Fd23) after the first retransmission of the sidelink communication.

As shown by reference number 930, the Tx UE may transmit the second retransmission of the sidelink communication in the second transmission occasion (e.g., $2^{nd}$ ReTx2) for the second retransmission of the sidelink communication. For example, the Tx UE may select the second transmission occasion (e.g., $2^{nd}$ ReTx2) based at least in part on performing the LBT procedure for the first transmission occasion (e.g., $2^{nd}$ ReTx1), the second transmission occasion (e.g., $2^{nd}$ ReTx2), and the third transmission occasion (e.g., $2^{nd}$ ReTx3) for the second retransmission of the sidelink communication.

The Tx UE may monitor for the sidelink feedback in the multiple feedback occasions (e.g., Fd31, Fd32, and Fd33) for the sidelink feedback associated with the first retransmission of the sidelink communication. As shown by reference number 935, the Tx UE may receive, from the Rx UE, sidelink feedback in the third feedback occasion (e.g., Fd33) for the sidelink feedback associated with the second retransmission of the sidelink communication, in connection with the Rx UE detecting LBT success in the third feedback occasion (e.g., Fd33) and detecting LBT failure in the first feedback occasion (e.g., Fd31) and the second feedback occasion (e.g., Fd32) for the sidelink feedback associated with the second retransmission of the sidelink communication. For example, the Tx UE may receive ACK feedback from the Rx UE in the third feedback occasion (e.g., Fd33) after the second retransmission of the sidelink communication. As shown by reference number 940, the Tx UE may transmit an indication of the ACK feedback to the network entity in the PUCCH resource.

In some aspects, the Tx UE may select the transmission occasion in a lower LBT sub-band or randomly select the transmission occasion within an LBT sub-band if more than one transmission occasion with successful LBT.

In some aspects, the Rx UE may select the feedback occasion in a lower LBT sub-band or randomly select the feedback occasion within an LBT sub-band if more than one feedback occasion with successful LBT.

In some aspects, multiple feedback occasions (e.g., Fd11, Fd12, and Fd13) may be distributed over the same LBT sub-bands for multiple feedback occasions. In some aspects, multiple feedback occasions (e.g., Fd21, Fd22, and Fd23) may be distributed over different time allocations (e.g., different symbols, slots or mini-slots) within one LBT sub-band (e.g., LBT_subband A). For multiple feedback occasions, the same distribution pattern (e.g., either distributed over different LBT sub-band or distributed over different time allocations) is used for feedbacks to all transmissions (e.g., initial transmission and retransmissions).

As indicated above, FIG. 9 is provided as an example. Other examples may differ from what is described with respect to FIG. 9.

Figure 10:
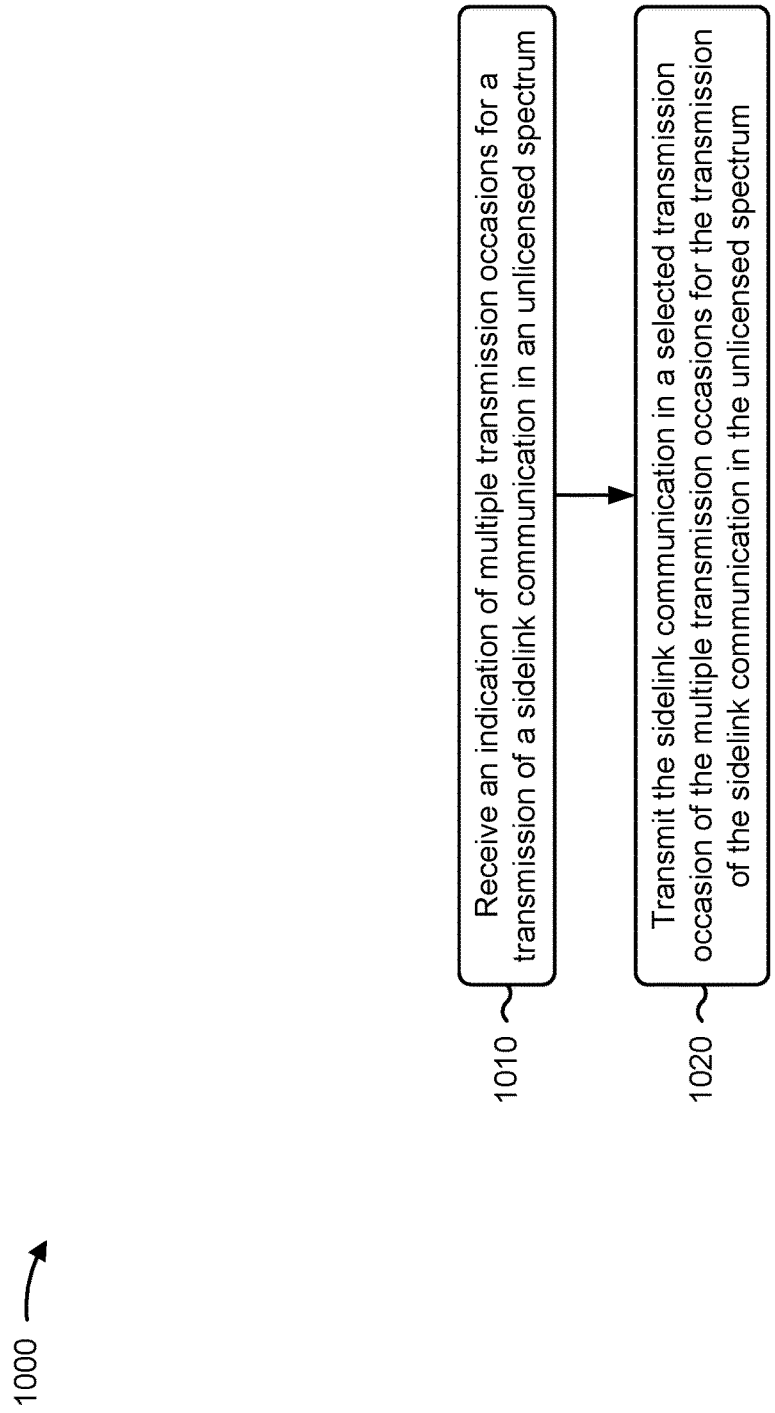
FIGS. 10-12 are diagrams illustrating example processes associated with resource allocation for unlicensed spectrum sidelink communications, in accordance with the present disclosure.

FIG. 10 is a diagram illustrating an example process 1000 performed, for example, by a first UE, in accordance with the present disclosure. Example process 1000 is an example where the first UE (e.g., UE 120) performs operations associated with resource allocation for unlicensed spectrum sidelink communications.

As shown in FIG. 10, in some aspects, process 1000 may include receiving, from a network entity, an indication of multiple transmission occasions for a transmission of a sidelink communication in an unlicensed spectrum (block 1010). For example, the first UE (e.g., using communication manager 140 and/or reception component 1302, depicted in FIG. 13) may receive, from a network entity, an indication of multiple transmission occasions for a transmission of a sidelink communication in an unlicensed spectrum, as described above.

As further shown in FIG. 10, in some aspects, process 1000 may include transmitting, to a second UE, the sidelink communication in a selected transmission occasion of the multiple transmission occasions for the transmission of the sidelink communication in the unlicensed spectrum (block 1020). For example, the first UE (e.g., using communication manager 140 and/or transmission component 1304, depicted in FIG. 13) may transmit, to a second UE, the sidelink communication in a selected transmission occasion of the multiple transmission occasions for the transmission of the sidelink communication in the unlicensed spectrum, as described above.

Process 1000 may include additional aspects, such as any single aspect or any combination of aspects described below and/or in connection with one or more other processes described elsewhere herein.

In a first aspect, process 1000 includes performing an LBT procedure for one or more of the multiple transmission occasions, and the selected transmission occasion is selected based at least in part on performing the LBT procedure.

In a second aspect, alone or in combination with the first aspect, the indication includes an indication of multiple transmission occasions for each of an initial transmission of the sidelink communication and one or more retransmission reservations for the sidelink communication.

In a third aspect, alone or in combination with one or more of the first and second aspects, the multiple transmission occasions for the transmission of the sidelink communication include a plurality of transmission occasions at different times.

In a fourth aspect, alone or in combination with one or more of the first through third aspects, the indication indicates a time and frequency resource for a first transmission occasion of the multiple transmission occasions, a time gap between consecutive transmission occasions of the multiple transmission occasions, and a number of transmission occasions of the multiple transmission occasions.

In a fifth aspect, alone or in combination with one or more of the first through fourth aspects, the multiple transmission occasions for the transmission of the sidelink communication include a plurality of transmission occasions at different frequencies.

In a sixth aspect, alone or in combination with one or more of the first through fifth aspects, the indication indicates a time and frequency resource for a first transmission occasion of the multiple transmission occasions, a frequency offset between adjacent transmission occasions of the multiple transmission occasions, and a number of transmission occasions of the multiple transmission occasions.

In a seventh aspect, alone or in combination with one or more of the first through sixth aspects, the indication indicates multiple feedback occasions for sidelink feedback associated with the transmission of the sidelink communication.

In an eighth aspect, alone or in combination with one or more of the first through seventh aspects, the multiple feedback occasions for the sidelink feedback associated with the transmission of the sidelink communication include a plurality of feedback occasions at different times.

In a ninth aspect, alone or in combination with one or more of the first through eighth aspects, the indication indicates a time gap between consecutive feedback occasions of the multiple feedback occasions and a number of feedback occasions of the multiple feedback occasions.

In a tenth aspect, alone or in combination with one or more of the first through ninth aspects, the multiple feedback occasions for the sidelink feedback associated with the transmission of the sidelink communication include a plurality of feedback occasions at different frequencies.

In an eleventh aspect, alone or in combination with one or more of the first through tenth aspects, the indication indicates a frequency offset between adjacent feedback occasions of the multiple feedback occasions and a number of feedback occasions of the multiple feedback occasions.

In a twelfth aspect, alone or in combination with one or more of the first through eleventh aspects, process 1000 includes receiving, from the second UE, the sidelink feedback associated with the transmission of the sidelink communication in a feedback occasion of the multiple feedback occasions.

In a thirteenth aspect, alone or in combination with one or more of the first through twelfth aspects, the indication indicates an uplink feedback resource associated with the transmission of the sidelink communication, and the uplink feedback resource is after the multiple feedback occasions for the sidelink feedback associated with the transmission of the sidelink communication.

In a fourteenth aspect, alone or in combination with one or more of the first through thirteenth aspects, process 1000 includes transmitting, in connection with a non-final transmission of multiple transmissions of the sidelink communication for which resources are allocated in the indication of the multiple transmission occasions for the transmission of the sidelink communication, an indication of the sidelink feedback in the uplink feedback resource only when ACK sidelink feedback is received from the second UE, or transmitting, in connection with a final transmission of the multiple transmissions of the sidelink communication for which resources are allocated in the indication of the multiple transmission occasions for the transmission of the sidelink communication, an indication of the sidelink feedback when ACK or NACK sidelink feedback is received from the second UE.

In a fifteenth aspect, alone or in combination with one or more of the first through fourteenth aspects, process 1000 includes starting a sidelink inactivity timer in connection with transmitting the sidelink communication to the second UE, and the multiple feedback occasions are included within a time duration of the sidelink inactivity timer.

In a sixteenth aspect, alone or in combination with one or more of the first through fifteenth aspects, the indication includes an indication of multiple transmission occasions and an indication of multiple feedback occasions for each of an initial transmission of the sidelink communication and one or more retransmission reservations for the sidelink communication.

In a seventeenth aspect, alone or in combination with one or more of the first through sixteenth aspects, the indication includes an indication of a first set of transmission occasions for a first transmission of a sidelink communication in the unlicensed spectrum and an indication of a second set of transmission occasions for a second transmission of the sidelink communication in the unlicensed spectrum, and transmitting the sidelink communication includes transmitting the first transmission of the sidelink communication in a first selected transmission occasion of the first set of transmission occasions.

In an eighteenth aspect, alone or in combination with one or more of the first through seventeenth aspects, process 1000 includes receiving, from the second UE, NACK sidelink feedback associated with the first transmission of the sidelink communication, and starting a sidelink HARQ retransmission timer in connection with receiving the NACK sidelink feedback from the second UE, and a time duration of the sidelink HARQ retransmission timer includes the second set of transmission occasions for the second transmission of the sidelink communication.

In a nineteenth aspect, alone or in combination with one or more of the first through eighteenth aspects, process 1000 includes retransmitting the sidelink communication to the second UE in a second selected transmission occasion of the second set of transmission occasions.

In a twentieth aspect, alone or in combination with one or more of the first through nineteenth aspects, the indication is included in an RRC communication.

In a twenty-first aspect, alone or in combination with one or more of the first through twentieth aspects, the RRC communication indicates a plurality of configurations, for the multiple transmission occasions, associated with different quality of service profiles, channel busy rate levels, or listen-before-talk success rates.

In a twenty-second aspect, alone or in combination with one or more of the first through twenty-first aspects, the indication is included in a MAC-CE.

In a twenty-third aspect, alone or in combination with one or more of the first through twenty-second aspects, process 1000 includes transmitting, to the network entity, sidelink assistance information, and receiving the indication includes receiving the MAC-CE including the indication in connection with transmitting the sidelink assistance information.

In a twenty-fourth aspect, alone or in combination with one or more of the first through twenty-third aspects, the indication, included in the MAC-CE, indicates an activated configuration for the multiple transmission occasions, from a plurality of configurations for the multiple transmission occasions indicated in an RRC communication.

In a twenty-fifth aspect, alone or in combination with one or more of the first through twenty-fourth aspects, the indication is included in DCI.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
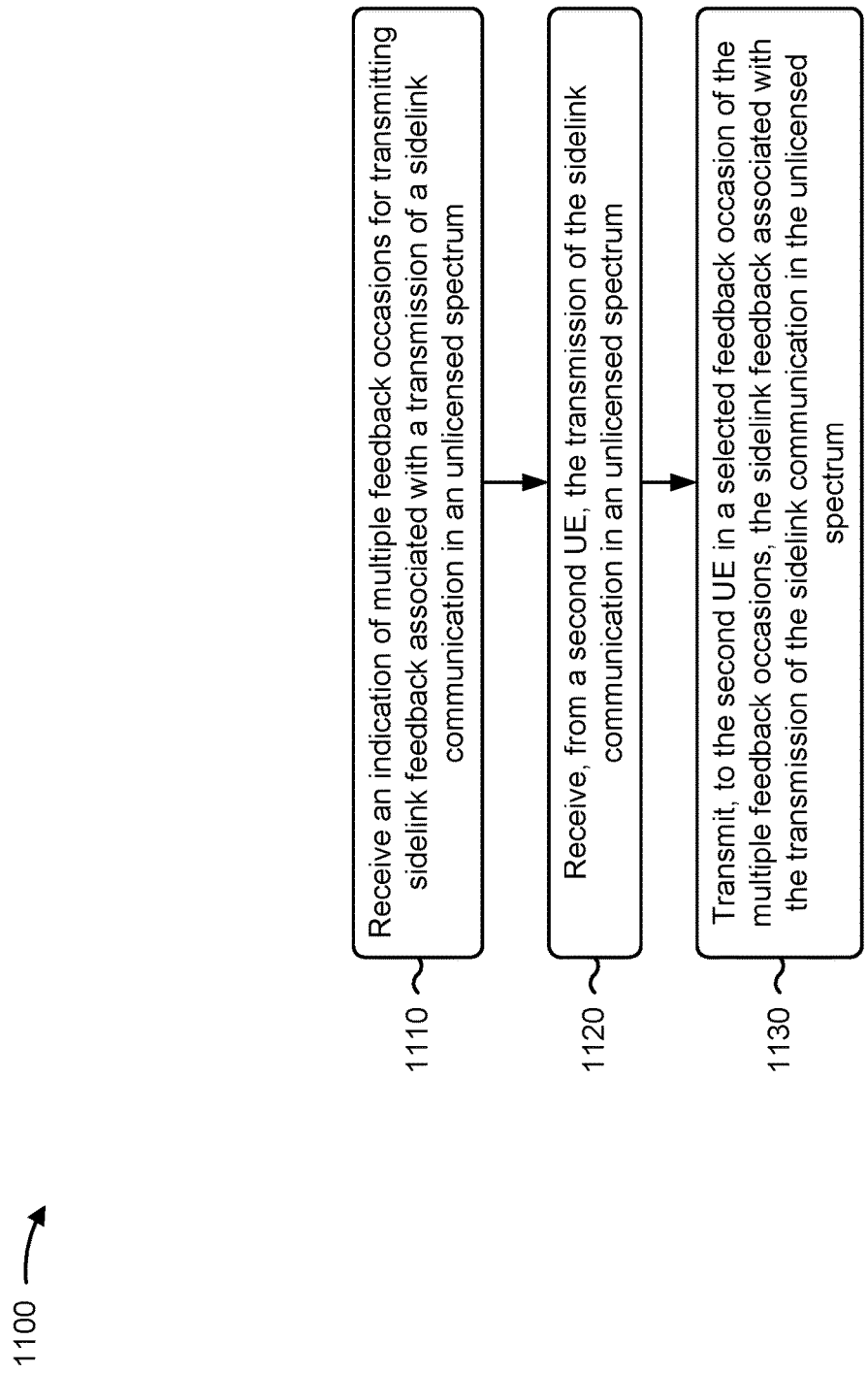

FIG. 11 is a diagram illustrating an example process 1100 performed, for example, by a first UE, in accordance with the present disclosure. Example process 1100 is an example where the first UE (e.g., UE 120) performs operations associated with resource allocation for unlicensed spectrum sidelink communications.

As shown in FIG. 11, in some aspects, process 1100 may include receiving, from a network entity, an indication of multiple feedback occasions for transmitting sidelink feedback associated with a transmission of a sidelink communication in an unlicensed spectrum (block 1110). For example, the first UE (e.g., using communication manager 140 and/or reception component 1302, depicted in FIG. 13) may receive, from a network entity, an indication of multiple feedback occasions for transmitting sidelink feedback associated with a transmission of a sidelink communication in an unlicensed spectrum, as described above.

As further shown in FIG. 11, in some aspects, process 1100 may include receiving, from a second UE, the transmission of the sidelink communication (block 1120). For example, the first UE (e.g., using communication manager 140 and/or reception component 1302, depicted in FIG. 13) may receive, from a second UE, the transmission of the sidelink communication, as described above.

As further shown in FIG. 11, in some aspects, process 1100 may include transmitting, to the second UE in a selected feedback occasion of the multiple feedback occasions, the sidelink feedback associated with the transmission of the sidelink communication in the unlicensed spectrum (block 1130). For example, the first UE (e.g., using communication manager 140 and/or transmission component 1304, depicted in FIG. 13) may transmit, to the second UE in a selected feedback occasion of the multiple feedback occasions, the sidelink feedback associated with the transmission of the sidelink communication in the unlicensed spectrum, as described above.

Process 1100 may include additional aspects, such as any single aspect or any combination of aspects described below and/or in connection with one or more other processes described elsewhere herein.

In a first aspect, the multiple feedback occasions for transmitting the sidelink feedback associated with the transmission of the sidelink communication include a plurality of feedback occasions at different times.

In a second aspect, the indication indicates a time gap between consecutive feedback occasions of the multiple feedback occasions and a number of feedback occasions of the multiple feedback occasions.

In a third aspect, the multiple feedback occasions for the sidelink feedback associated with the transmission of the sidelink communication include a plurality of feedback occasions at different frequencies.

In a fourth aspect, the indication indicates a frequency offset between adjacent feedback occasions of the multiple feedback occasions and a number of feedback occasions of the multiple feedback occasions.

In a fifth aspect, process 1100 includes performing an LBT procedure for one or more of the multiple feedback occasions, and the selected feedback occasion is selected based at least in part on performing the LBT procedure.

In a sixth aspect, process 1100 includes starting a sidelink inactivity timer in connection with receiving the transmission of the sidelink communication from the second UE, and the multiple feedback occasions are included within a time duration of the sidelink inactivity timer.

In a seventh aspect, the indication includes an indication of the multiple feedback occasions for each of an initial transmission of the sidelink communication and one or more retransmission reservations for the sidelink communication.

In an eighth aspect, receiving the transmission of the sidelink communication includes receiving, from the second UE, the transmission of the sidelink communication in a transmission occasion of multiple transmission occasions associated with the transmission of the sidelink communication.

In a ninth aspect, the multiple transmission occasions associated with the transmission of the sidelink communication include at least one of a plurality of transmission occasions at different times or a plurality of transmission occasions at different frequencies.

In a tenth aspect, process 1100 includes the indication includes an indication of a first set of transmission occasions associated with a first transmission of a sidelink communication, an indication of a first set of feedback occasions associated with the first transmission of the sidelink communication, an indication of a second set of transmission occasions for a second transmission of the sidelink communication, and an indication of a second set of feedback occasions associated with the second set of associated with second transmission of the sidelink communication, receiving the sidelink communication includes receiving the first transmission of the sidelink communication in a transmission occasion of the first set of transmission occasions, and transmitting the sidelink feedback includes transmitting, to the second UE in a selected feedback occasion of the first set of feedback occasions, NACK sidelink feedback associated with the first transmission of the sidelink communication.

In an eleventh aspect, process 1100 includes starting a sidelink HARQ retransmission timer in connection with transmitting the NACK sidelink feedback to the second UE, and a time duration of the sidelink HARQ retransmission timer includes the second set of transmission occasions associated the second transmission of the sidelink communication.

In a twelfth aspect, the indication is included in an RRC communication.

In a thirteenth aspect, the indication is included in a MAC-CE.

In a fourteenth aspect, the indication is included in SCI.

In a fifteenth aspect, receiving the indication of the multiple feedback occasions includes receiving the indication of the multiple feedback occasions from the second UE.

In a sixteenth aspect, receiving the indication of the multiple feedback occasions includes receiving the indication of the multiple feedback occasions from a network entity.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
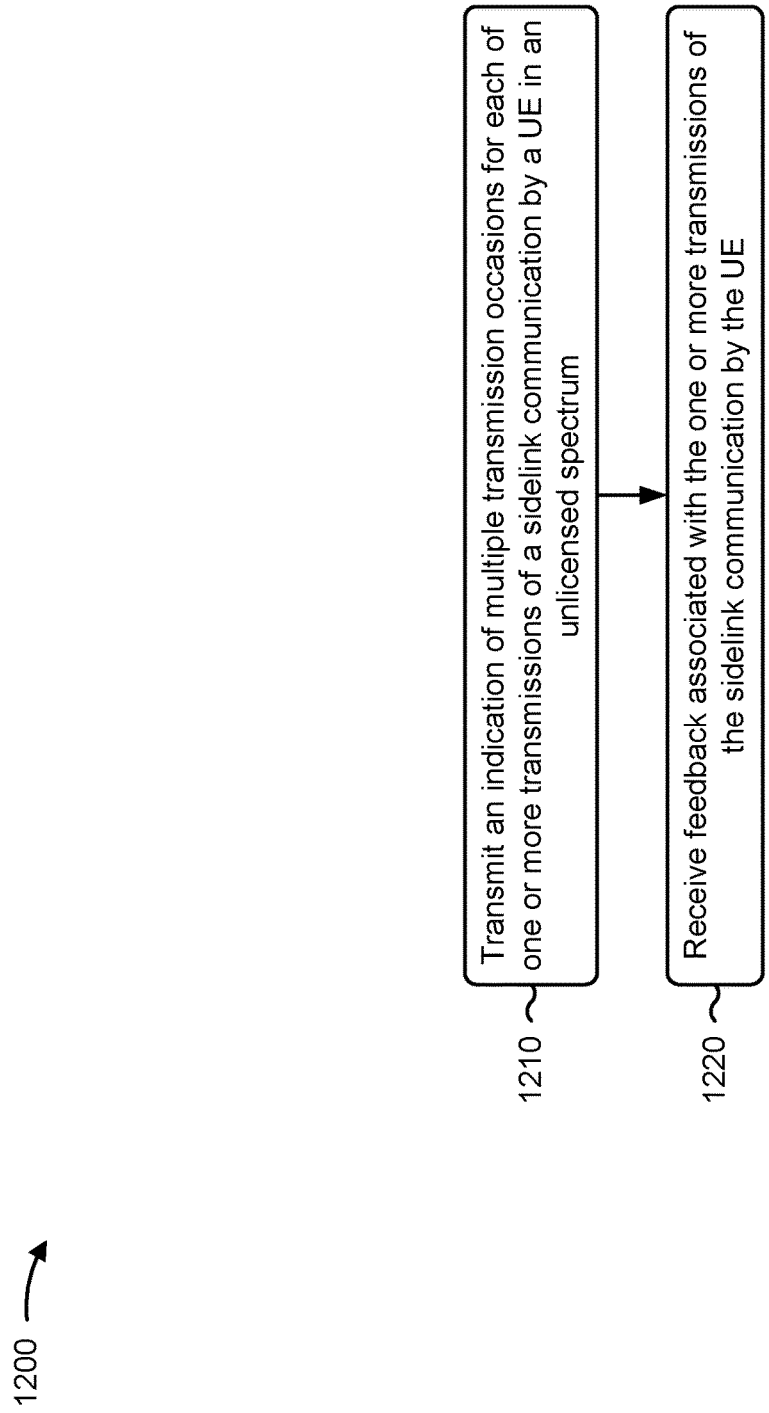

FIG. 12 is a diagram illustrating an example process 1200 performed, for example, by a network entity, in accordance with the present disclosure. Example process 1200 is an example where the network entity (e.g., network entity 705) performs operations associated with resource allocation for unlicensed spectrum sidelink communications.

As shown in FIG. 12, in some aspects, process 1200 may include transmitting an indication of multiple transmission occasions for each of one or more transmissions of a sidelink communication by a UE in an unlicensed spectrum (block 1210). For example, the network entity (e.g., using communication manager 150 and/or transmission component 1404, depicted in FIG. 14) may transmit an indication of multiple transmission occasions for each of one or more transmissions of a sidelink communication by a UE in an unlicensed spectrum, as described above.

As further shown in FIG. 12, in some aspects, process 1200 may include receiving feedback associated with the one or more transmissions of the sidelink communication by the UE (block 1220). For example, the network entity (e.g., using communication manager 150 and/or reception component 1402, depicted in FIG. 14) may receive feedback associated with the one or more transmissions of the sidelink communication by the UE, as described above.

Process 1200 may include additional aspects, such as any single aspect or any combination of aspects described below and/or in connection with one or more other processes described elsewhere herein.

In a first aspect, the indication includes an indication of multiple transmission occasions for each of an initial transmission of the sidelink communication and one or more retransmission reservations for the sidelink communication.

In a second aspect, the multiple transmission occasions for each of the one or more transmissions of the sidelink communication include a plurality of transmission occasions at different times for each of the one or more transmissions of the sidelink communication.

In a third aspect, the indication indicates a time and frequency resource for a first transmission occasion of the multiple transmission occasions for each of the one or more transmissions of the sidelink communication, a time gap between consecutive transmission occasions of the multiple transmission occasions for each of the one or more transmissions of the sidelink communication, and a number of transmission occasions of the multiple transmission occasions for each of the one or more transmissions of the sidelink communication.

In a fourth aspect, the multiple transmission occasions for each of the one or more transmissions of the sidelink communication include a plurality of transmission occasions at different frequencies for each of the one or more transmissions of the sidelink communication.

In a fifth aspect, the indication indicates a time and frequency resource for a first transmission occasion of the multiple transmission occasions for each of the one or more transmissions of the sidelink communication, a frequency offset between adjacent transmission occasions of the multiple transmission occasions for each of the one or more transmissions of the sidelink communication, and a number of transmission occasions of the multiple transmission occasions for each of the one or more transmissions of the sidelink communication.

In a sixth aspect, the indication indicates multiple feedback occasions for sidelink feedback associated with each of the one or more transmissions of the sidelink communication.

In a seventh aspect, the multiple feedback occasions for the sidelink feedback associated with each of the one or more transmissions of the sidelink communication include a plurality of feedback occasions at different times for each of the one or more transmissions of the sidelink communication.

In an eighth aspect, the indication indicates a time gap between consecutive feedback occasions of the multiple feedback occasions for each of the one or more transmissions of the sidelink communication and a number of feedback occasions of the multiple feedback occasions for each of the one or more transmissions of the sidelink communication.

In a ninth aspect, the multiple feedback occasions for the sidelink feedback associated with each of the one or more transmissions of the sidelink communication include a plurality of feedback occasions at different frequencies for each of the one or more transmissions of the sidelink communication.

In a tenth aspect, the indication indicates a frequency offset between adjacent feedback occasions of the multiple feedback occasions for each of the one or more transmissions of the sidelink communication and a number of feedback occasions of the multiple feedback occasions for each of the one or more transmissions of the sidelink communication.

In an eleventh aspect, the indication indicates an uplink feedback resource associated with each transmission of the one or more transmissions of the sidelink communication, and the uplink feedback resource associated with each transmission of the one or more transmissions of the sidelink communication is after the multiple feedback occasions for the sidelink feedback associated with that transmission of the one or more transmissions of the sidelink communication.

In a twelfth aspect, receiving feedback associated with the one or more transmissions of the sidelink communication by the UE includes receiving, in connection with a non-final transmission of the one or more transmissions of the sidelink communication, ACK-only feedback in the uplink feedback resource associated with the non-final transmission of the one or more transmissions of the sidelink communication, or receiving, in connection with a final transmission of the one or more transmissions of the sidelink communication, ACK or NACK feedback in the uplink feedback resource associated with the final transmission of the one or more transmissions of the sidelink communication.

In a thirteenth aspect, the indication includes an indication of multiple transmission occasions and an indication of multiple feedback occasions for each of an initial transmission of the sidelink communication and one or more retransmission reservations for the sidelink communication.

In a fourteenth aspect, the indication is included in an RRC communication.

In a fifteenth aspect, the RRC communication indicates a plurality of configurations, for the multiple transmission occasions, associated with different quality of service profiles, channel busy rate levels, or listen-before-talk success rates.

In a sixteenth aspect, the indication is included in a MAC-CE.

In a seventeenth aspect, process 1200 includes receiving sidelink assistance information associated with the UE, and transmitting the indication includes transmitting the MAC-CE including the indication in connection with receiving the sidelink assistance information associated with the UE.

In an eighteenth aspect, the indication, included in the MAC-CE, indicates an activated configuration for the multiple transmission occasions, from a plurality of configurations for the multiple transmission occasions indicated in an RRC communication.

In a nineteenth aspect, the indication is included in DCI.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
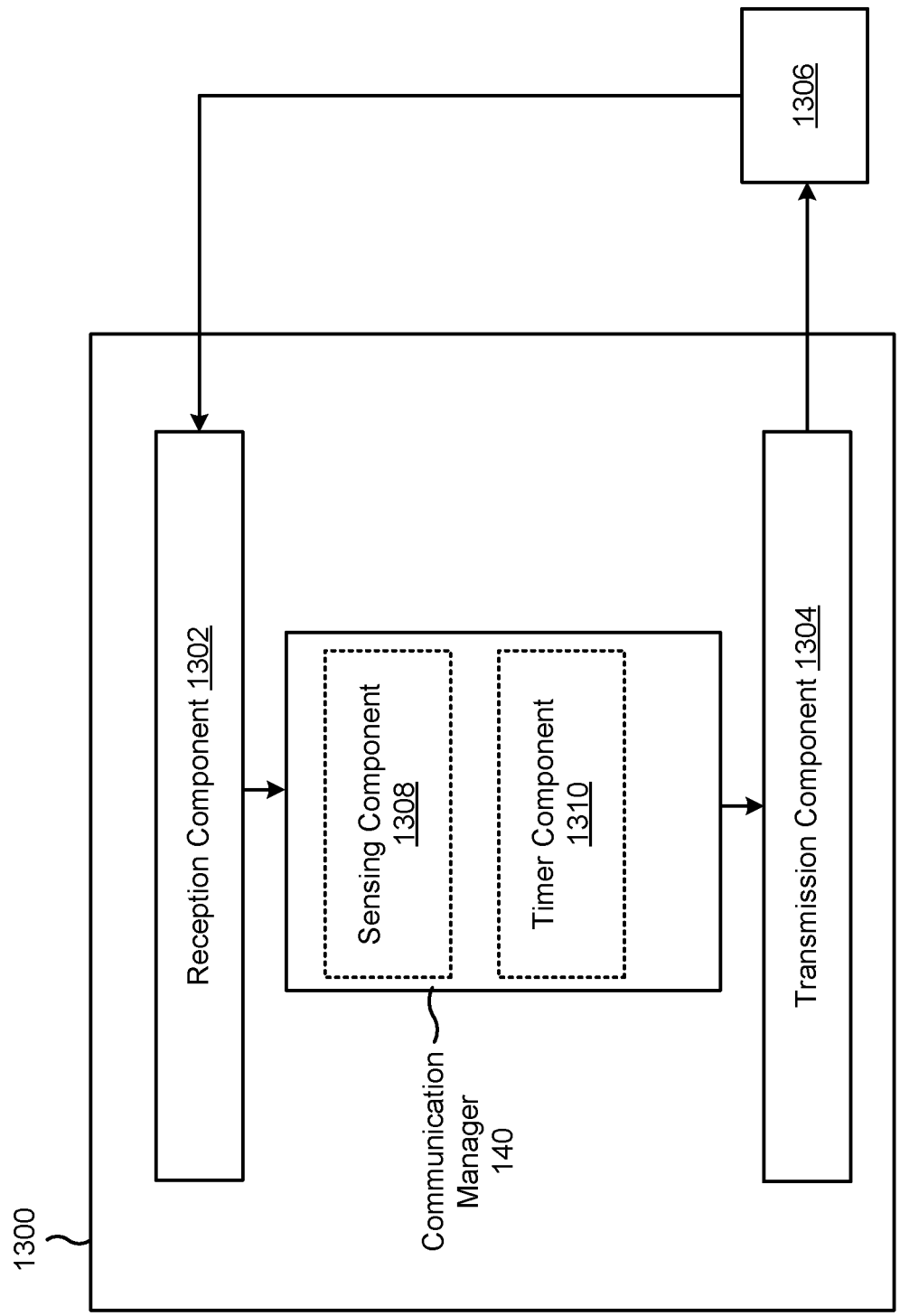
FIGS. 13-14 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a sensing component 1308 and/or a timer component 1310, among other examples.

In some aspects, the apparatus 1300 may be configured to perform one or more operations described herein in connection with FIGS. 7-9. Additionally, or alternatively, the apparatus 1300 may be configured to perform one or more processes described herein, such as process 1000 of FIG. 10, process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive, from a network entity, an indication of multiple transmission occasions for a transmission of a sidelink communication in an unlicensed spectrum. The transmission component 1304 may transmit, to a second UE, the sidelink communication in a selected transmission occasion of the multiple transmission occasions for the transmission of the sidelink communication in the unlicensed spectrum.

The sensing component 1308 may perform an LBT procedure for one or more of the multiple transmission occasions, wherein the selected transmission occasion is selected based at least in part on performing the LBT procedure.

The reception component 1302 may receive, from the second UE, the sidelink feedback associated with the transmission of the sidelink communication in a feedback occasion of the multiple feedback occasions.

The transmission component 1304 may transmit, in connection with a non-final transmission of multiple transmissions of the sidelink communication for which resources are allocated in the indication of the multiple transmission occasions for the transmission of the sidelink communication, an indication of the sidelink feedback in the uplink feedback resource only when ACK sidelink feedback is received from the second UE.

The transmission component 1304 may transmit, in connection with a final transmission of the multiple transmissions of the sidelink communication for which resources are allocated in the indication of the multiple transmission occasions for the transmission of the sidelink communication, an indication of the sidelink feedback when ACK or NACK sidelink feedback is received from the second UE.

The timer component 1310 may start a sidelink inactivity timer in connection with transmitting the sidelink communication to the second UE, wherein the multiple feedback occasions are included within a time duration of the sidelink inactivity timer.

The reception component 1302 may receive, from the second UE, NACK sidelink feedback associated with the first transmission of the sidelink communication.

The timer component 1310 may start a sidelink HARQ retransmission timer in connection with receiving the NACK sidelink feedback from the second UE, wherein a time duration of the sidelink HARQ retransmission timer includes the second set of transmission occasions for the second transmission of the sidelink communication.

The transmission component 1304 may retransmit the sidelink communication to the second UE in a second selected transmission occasion of the second set of transmission occasions.

The transmission component 1304 may transmit, to the network entity, sidelink assistance information, wherein receiving the indication comprises receiving the MAC-CE including the indication in connection with transmitting the sidelink assistance information.

The reception component 1302 may receive, from a network entity, an indication of multiple feedback occasions for transmitting sidelink feedback associated with a transmission of a sidelink communication in an unlicensed spectrum. The reception component 1302 may receive, from a second UE, the transmission of the sidelink communication. The transmission component 1304 may transmit, to the second UE in a selected feedback occasion of the multiple feedback occasions, the sidelink feedback associated with the transmission of the sidelink communication in the unlicensed spectrum.

The sensing component 1308 may perform an LBT procedure for one or more of the multiple feedback occasions, wherein the selected feedback occasion is selected based at least in part on performing the LBT procedure.

The timer component 1310 may start a sidelink inactivity timer in connection with receiving the transmission of the sidelink communication from the second UE, wherein the multiple feedback occasions are included within a time duration of the sidelink inactivity timer.

The reception component 1302 may receive the sidelink communication comprises receiving the first transmission of the sidelink communication in a transmission occasion of the first set of transmission occasions.

The transmission component 1304 may transmit the sidelink feedback comprises transmitting, to the second UE in a selected feedback occasion of the first set of feedback occasions, NACK sidelink feedback associated with the first transmission of the sidelink communication.

The timer component 1310 may start a sidelink HARQ retransmission timer in connection with transmitting the NACK sidelink feedback to the second UE, wherein a time duration of the sidelink HARQ retransmission timer includes the second set of transmission occasions associated the second transmission of the sidelink communication.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
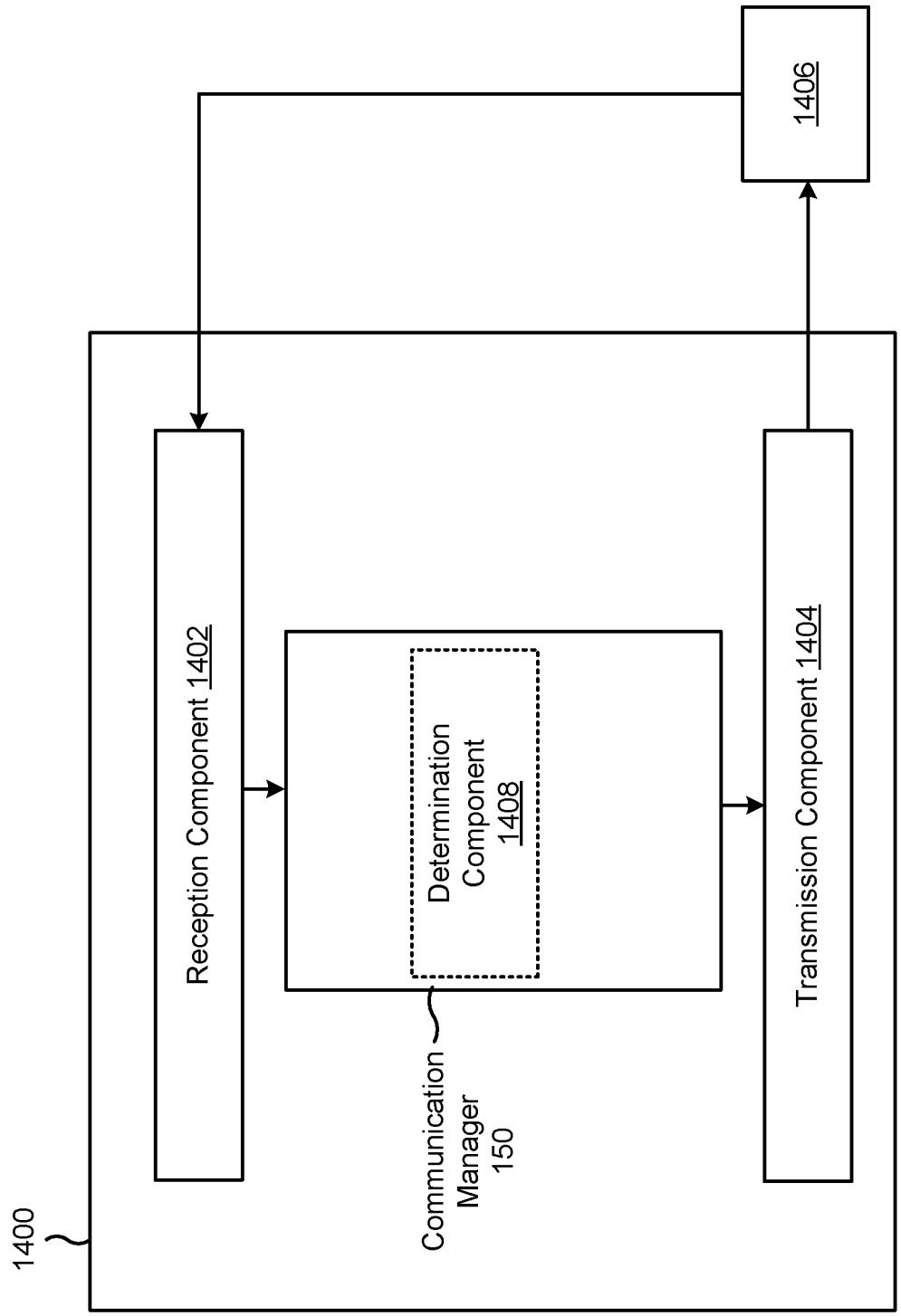

FIG. 14 is a diagram of an example apparatus 1400 for wireless communication. The apparatus 1400 may be a network entity, or a network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a determination component 1408, among other examples.

In some aspects, the apparatus 1400 may be configured to perform one or more operations described herein in connection with FIGS. 7-9. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network entity described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network entity described in connection with FIG. 2. In some aspects, the transmission component 1404 may be co-located with the reception component 1402 in a transceiver.

The transmission component 1404 may transmit an indication of multiple transmission occasions for each of one or more transmissions of a sidelink communication by a UE in an unlicensed spectrum. The reception component 1402 may receive feedback associated with the one or more transmissions of the sidelink communication by the UE.

The reception component 1402 may receive sidelink assistance information associated with the UE, wherein transmitting the indication comprises transmitting the MAC-CE including the indication in connection with receiving the sidelink assistance information associated with the UE.

The determination component 1408 may determine the multiple transmission occasions for each of the one or more transmissions of the sidelink communication by the UE in the unlicensed spectrum.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a first user equipment (UE), comprising: receiving, from a network entity, an indication of multiple transmission occasions for a transmission of a sidelink communication in an unlicensed spectrum; and transmitting, to a second UE, the sidelink communication in a selected transmission occasion of the multiple transmission occasions for the transmission of the sidelink communication in the unlicensed spectrum.

Aspect 2: The method of Aspect 1, further comprising: performing a listen-before-talk (LBT) procedure for one or more of the multiple transmission occasions, wherein the selected transmission occasion is selected based at least in part on performing the LBT procedure.

Aspect 3: The method of any of Aspects 1-2, wherein the indication includes an indication of multiple transmission occasions for each of an initial transmission of the sidelink communication and one or more retransmission reservations for the sidelink communication.

Aspect 4: The method of any of Aspects 1-3, wherein the multiple transmission occasions for the transmission of the sidelink communication include a plurality of transmission occasions at different times.

Aspect 5: The method of Aspect 4, wherein the indication indicates a time and frequency resource for a first transmission occasion of the multiple transmission occasions, a time gap between consecutive transmission occasions of the multiple transmission occasions, and a number of transmission occasions of the multiple transmission occasions.

Aspect 6: The method of any of Aspects 1-5, wherein the multiple transmission occasions for the transmission of the sidelink communication include a plurality of transmission occasions at different frequencies.

Aspect 7: The method of Aspect 6, wherein the indication indicates a time and frequency resource for a first transmission occasion of the multiple transmission occasions, a frequency offset between adjacent transmission occasions of the multiple transmission occasions, and a number of transmission occasions of the multiple transmission occasions.

Aspect 8: The method of any of Aspects 1-7, wherein the indication indicates multiple feedback occasions for sidelink feedback associated with the transmission of the sidelink communication.

Aspect 9: The method of Aspect 8, wherein the multiple feedback occasions for the sidelink feedback associated with the transmission of the sidelink communication include a plurality of feedback occasions at different times.

Aspect 10: The method of Aspect 9, wherein the indication indicates a time gap between consecutive feedback occasions of the multiple feedback occasions and a number of feedback occasions of the multiple feedback occasions.

Aspect 11: The method of any of Aspects 8-10, wherein the multiple feedback occasions for the sidelink feedback associated with the transmission of the sidelink communication include a plurality of feedback occasions at different frequencies.

Aspect 12: The method of Aspect 11, wherein the indication indicates a frequency offset between adjacent feedback occasions of the multiple feedback occasions and a number of feedback occasions of the multiple feedback occasions.

Aspect 13: The method of any of Aspects 8-12, further comprising: receiving, from the second UE, the sidelink feedback associated with the transmission of the sidelink communication in a feedback occasion of the multiple feedback occasions.

Aspect 14: The method of Aspect 13, wherein the indication indicates an uplink feedback resource associated with the transmission of the sidelink communication, and wherein the uplink feedback resource is after the multiple feedback occasions for the sidelink feedback associated with the transmission of the sidelink communication.

Aspect 15: The method of Aspect 14, further comprising: transmitting, in connection with a non-final transmission of multiple transmissions of the sidelink communication for which resources are allocated in the indication of the multiple transmission occasions for the transmission of the sidelink communication, an indication of the sidelink feedback in the uplink feedback resource only when acknowledgement (ACK) sidelink feedback is received from the second UE; or transmitting, in connection with a final transmission of the multiple transmissions of the sidelink communication for which resources are allocated in the indication of the multiple transmission occasions for the transmission of the sidelink communication, an indication of the sidelink feedback when ACK or negative acknowledgement (NACK) sidelink feedback is received from the second UE.

Aspect 16: The method of any of Aspects 8-15, further comprising: starting a sidelink inactivity timer in connection with transmitting the sidelink communication to the second UE, wherein the multiple feedback occasions are included within a time duration of the sidelink inactivity timer.

Aspect 17: The method of any of Aspects 1-16, wherein the indication includes an indication of multiple transmission occasions and an indication of multiple feedback occasions for each of an initial transmission of the sidelink communication and one or more retransmission reservations for the sidelink communication.

Aspect 18: The method of any of Aspects 1-17, wherein the indication includes an indication of a first set of transmission occasions for a first transmission of a sidelink communication in the unlicensed spectrum and an indication of a second set of transmission occasions for a second transmission of the sidelink communication in the unlicensed spectrum, and wherein transmitting the sidelink communication comprises: transmitting the first transmission of the sidelink communication in a first selected transmission occasion of the first set of transmission occasions.

Aspect 19: The method of Aspect 18, further comprising: receiving, from the second UE, negative acknowledgement (NACK) sidelink feedback associated with the first transmission of the sidelink communication; and starting a sidelink hybrid automatic repeat request (HARQ) retransmission timer in connection with receiving the NACK sidelink feedback from the second UE, wherein a time duration of the sidelink HARQ retransmission timer includes the second set of transmission occasions for the second transmission of the sidelink communication.

Aspect 20: The method of Aspect 19, further comprising: retransmitting the sidelink communication to the second UE in a second selected transmission occasion of the second set of transmission occasions.

Aspect 21: The method of any of Aspects 1-20, wherein the indication is included in a radio resource control (RRC) communication.

Aspect 22: The method of Aspect 21, wherein the RRC communication indicates a plurality of configurations, for the multiple transmission occasions, associated with different quality of service profiles, channel busy rate levels, or listen-before-talk success rates.

Aspect 23: The method of any of Aspects 1-20, wherein the indication is included in a medium access control (MAC) control element (MAC-CE).

Aspect 24: The method of Aspect 23, further comprising: transmitting, to the network entity, sidelink assistance information, wherein receiving the indication comprises receiving the MAC-CE including the indication in connection with transmitting the sidelink assistance information.

Aspect 25: The method of any of Aspects 23-24, wherein the indication, included in the MAC-CE, indicates an activated configuration for the multiple transmission occasions, from a plurality of configurations for the multiple transmission occasions indicated in a radio resource control (RRC) communication.

Aspect 26: The method of any of Aspects 1-20, wherein the indication is included in downlink control information (DCI).

Aspect 27: A method of wireless communication performed by a first user equipment (UE), comprising: receiving, from a network entity, an indication of multiple feedback occasions for transmitting sidelink feedback associated with a transmission of a sidelink communication in an unlicensed spectrum; receiving, from a second UE, the transmission of the sidelink communication; and transmitting, to the second UE in a selected feedback occasion of the multiple feedback occasions, the sidelink feedback associated with the transmission of the sidelink communication in the unlicensed spectrum.

Aspect 28: The method of Aspect 27, wherein the multiple feedback occasions for transmitting the sidelink feedback associated with the transmission of the sidelink communication include a plurality of feedback occasions at different times.

Aspect 29: The method of Aspect 28, wherein the indication indicates a time gap between consecutive feedback occasions of the multiple feedback occasions and a number of feedback occasions of the multiple feedback occasions.

Aspect 30: The method of any of Aspects 27-29, wherein the multiple feedback occasions for the sidelink feedback associated with the transmission of the sidelink communication include a plurality of feedback occasions at different frequencies.

Aspect 31: The method of Aspect 30, wherein the indication indicates a frequency offset between adjacent feedback occasions of the multiple feedback occasions and a number of feedback occasions of the multiple feedback occasions.

Aspect 32: The method of any of Aspects 27-31, further comprising: performing a listen-before-talk (LBT) procedure for one or more of the multiple feedback occasions, wherein the selected feedback occasion is selected based at least in part on performing the LBT procedure.

Aspect 33: The method of any of Aspects 27-32, further comprising: starting a sidelink inactivity timer in connection with receiving the transmission of the sidelink communication from the second UE, wherein the multiple feedback occasions are included within a time duration of the sidelink inactivity timer.

Aspect 34: The method of any of Aspects 27-33, wherein the indication includes an indication of the multiple feedback occasions for each of an initial transmission of the sidelink communication and one or more retransmission reservations for the sidelink communication.

Aspect 35: The method of any of Aspects 27-34, wherein receiving the transmission of the sidelink communication comprises: receiving, from the second UE, the transmission of the sidelink communication in a transmission occasion of multiple transmission occasions associated with the transmission of the sidelink communication.

Aspect 36: The method of Aspect 35, wherein the multiple transmission occasions associated with the transmission of the sidelink communication include at least one of a plurality of transmission occasions at different times or a plurality of transmission occasions at different frequencies.

Aspect 37: The method of any of Aspects 27-36, wherein: the indication includes an indication of a first set of transmission occasions associated with a first transmission of a sidelink communication, an indication of a first set of feedback occasions associated with the first transmission of the sidelink communication, an indication of a second set of transmission occasions for a second transmission of the sidelink communication, and an indication of a second set of feedback occasions associated with the second set of associated with second transmission of the sidelink communication, the indication includes an indication of a first set of transmission occasions associated with a first transmission of a sidelink communication, an indication of a first set of feedback occasions associated with the first transmission of the sidelink communication, an indication of a second set of transmission occasions for a second transmission of the sidelink communication, and an indication of a second set of feedback occasions associated with the second set of associated with second transmission of the sidelink communication, receiving the sidelink communication comprises receiving the first transmission of the sidelink communication in a transmission occasion of the first set of transmission occasions, and transmitting the sidelink feedback comprises transmitting, to the second UE in a selected feedback occasion of the first set of feedback occasions, negative acknowledgement (NACK) sidelink feedback associated with the first transmission of the sidelink communication.

Aspect 38: The method of Aspect 37, further comprising: starting a sidelink hybrid automatic repeat request (HARQ) retransmission timer in connection with transmitting the NACK sidelink feedback to the second UE, wherein a time duration of the sidelink HARQ retransmission timer includes the second set of transmission occasions associated the second transmission of the sidelink communication.

Aspect 39: The method of any of Aspects 27-38, wherein the indication is included in a radio resource control (RRC) communication.

Aspect 40: The method of any of Aspects 27-38, wherein the indication is included in a medium access control (MAC) control element (MAC-CE).

Aspect 41: The method of any of Aspects 27-38, wherein the indication is included in sidelink control information (SCI).

Aspect 42: The method of any of Aspects 27-41, wherein receiving the indication of the multiple feedback occasions comprises: receiving the indication of the multiple feedback occasions from the second UE.

Aspect 43: The method of any of Aspects 27-40 and 42, wherein receiving the indication of the multiple feedback occasions comprises: receiving the indication of the multiple feedback occasions from a network entity.

Aspect 44: A method of wireless communication performed by a network entity, comprising: transmitting an indication of multiple transmission occasions for each of one or more transmissions of a sidelink communication by a user equipment (UE) in an unlicensed spectrum; and receiving feedback associated with the one or more transmissions of the sidelink communication by the UE.

Aspect 45: The method of Aspect 44, wherein the indication includes an indication of multiple transmission occasions for each of an initial transmission of the sidelink communication and one or more retransmission reservations for the sidelink communication.

Aspect 46: The method of any of Aspects 44-45, wherein the multiple transmission occasions for each of the one or more transmissions of the sidelink communication include a plurality of transmission occasions at different times for each of the one or more transmissions of the sidelink communication.

Aspect 47: The method of Aspect 46, wherein the indication indicates a time and frequency resource for a first transmission occasion of the multiple transmission occasions for each of the one or more transmissions of the sidelink communication, a time gap between consecutive transmission occasions of the multiple transmission occasions for each of the one or more transmissions of the sidelink communication, and a number of transmission occasions of the multiple transmission occasions for each of the one or more transmissions of the sidelink communication.

Aspect 48: The method of any of Aspects 44-47, wherein the multiple transmission occasions for each of the one or more transmissions of the sidelink communication include a plurality of transmission occasions at different frequencies for each of the one or more transmissions of the sidelink communication.

Aspect 49: The method of Aspect 48, wherein the indication indicates a time and frequency resource for a first transmission occasion of the multiple transmission occasions for each of the one or more transmissions of the sidelink communication, a frequency offset between adjacent transmission occasions of the multiple transmission occasions for each of the one or more transmissions of the sidelink communication, and a number of transmission occasions of the multiple transmission occasions for each of the one or more transmissions of the sidelink communication.

Aspect 50: The method of any of Aspects 44-49, wherein the indication indicates multiple feedback occasions for sidelink feedback associated with each of the one or more transmissions of the sidelink communication.

Aspect 51: The method of Aspect 50, wherein the multiple feedback occasions for the sidelink feedback associated with each of the one or more transmissions of the sidelink communication include a plurality of feedback occasions at different times for each of the one or more transmissions of the sidelink communication.

Aspect 52: The method of Aspect 51, wherein the indication indicates a time gap between consecutive feedback occasions of the multiple feedback occasions for each of the one or more transmissions of the sidelink communication and a number of feedback occasions of the multiple feedback occasions for each of the one or more transmissions of the sidelink communication.

Aspect 53: The method of any of Aspects 50-52, wherein the multiple feedback occasions for the sidelink feedback associated with each of the one or more transmissions of the sidelink communication include a plurality of feedback occasions at different frequencies for each of the one or more transmissions of the sidelink communication.

Aspect 54: The method of Aspect 53, wherein the indication indicates a frequency offset between adjacent feedback occasions of the multiple feedback occasions for each of the one or more transmissions of the sidelink communication and a number of feedback occasions of the multiple feedback occasions for each of the one or more transmissions of the sidelink communication.

Aspect 55: The method of any of Aspects 50-54, wherein the indication indicates an uplink feedback resource associated with each transmission of the one or more transmissions of the sidelink communication, and wherein the uplink feedback resource associated with each transmission of the one or more transmissions of the sidelink communication is after the multiple feedback occasions for the sidelink feedback associated with that transmission of the one or more transmissions of the sidelink communication.

Aspect 56: The method of Aspect 55, wherein receiving feedback associated with the one or more transmissions of the sidelink communication by the UE comprises: receiving, in connection with a non-final transmission of the one or more transmissions of the sidelink communication, acknowledgement (ACK)-only feedback in the uplink feedback resource associated with the non-final transmission of the one or more transmissions of the sidelink communication; or receiving, in connection with a final transmission of the one or more transmissions of the sidelink communication, ACK or negative acknowledgement (NACK) feedback in the uplink feedback resource associated with the final transmission of the one or more transmissions of the sidelink communication.

Aspect 57: The method of any of Aspects 44-56, wherein the indication includes an indication of multiple transmission occasions and an indication of multiple feedback occasions for each of an initial transmission of the sidelink communication and one or more retransmission reservations for the sidelink communication.

Aspect 58: The method of any of Aspects 44-57, wherein the indication is included in a radio resource control (RRC) communication.

Aspect 59: The method of Aspect 58, wherein the RRC communication indicates a plurality of configurations, for the multiple transmission occasions, associated with different quality of service profiles, channel busy rate levels, or listen-before-talk success rates.

Aspect 60: The method of any of Aspects 44-57, wherein the indication is included in a medium access control (MAC) control element (MAC-CE).

Aspect 61: The method of Aspect 60, further comprising: receiving sidelink assistance information associated with the UE, wherein transmitting the indication comprises transmitting the MAC-CE including the indication in connection with receiving the sidelink assistance information associated with the UE.

Aspect 62: The method of any of Aspects 60-61, wherein the indication, included in the MAC-CE, indicates an activated configuration for the multiple transmission occasions, from a plurality of configurations for the multiple transmission occasions indicated in a radio resource control (RRC) communication.

Aspect 63: The method of any of Aspects 44-57, wherein the indication is included in downlink control information (DCI).

Aspect 64: An apparatus for wireless communication at a device, comprising a processor; memory coupled with the processor; and instructions stored in the memory and executable by the processor to cause the apparatus to perform the method of one or more of Aspects 1-26.

Aspect 65: A device for wireless communication, comprising a memory and one or more processors coupled to the memory, the one or more processors configured to perform the method of one or more of Aspects 1-26.

Aspect 66: An apparatus for wireless communication, comprising at least one means for performing the method of one or more of Aspects 1-26.

Aspect 67: A non-transitory computer-readable medium storing code for wireless communication, the code comprising instructions executable by a processor to perform the method of one or more of Aspects 1-26.

Aspect 68: A non-transitory computer-readable medium storing a set of instructions for wireless communication, the set of instructions comprising one or more instructions that, when executed by one or more processors of a device, cause the device to perform the method of one or more of Aspects 1-26.

Aspect 69: An apparatus for wireless communication at a device, comprising a processor; memory coupled with the processor; and instructions stored in the memory and executable by the processor to cause the apparatus to perform the method of one or more of Aspects 27-43.

Aspect 70: A device for wireless communication, comprising a memory and one or more processors coupled to the memory, the one or more processors configured to perform the method of one or more of Aspects 27-43.

Aspect 71: An apparatus for wireless communication, comprising at least one means for performing the method of one or more of Aspects 47-43.

Aspect 72: A non-transitory computer-readable medium storing code for wireless communication, the code comprising instructions executable by a processor to perform the method of one or more of Aspects 37-43.

Aspect 73: A non-transitory computer-readable medium storing a set of instructions for wireless communication, the set of instructions comprising one or more instructions that, when executed by one or more processors of a device, cause the device to perform the method of one or more of Aspects 27-43.

Aspect 74: An apparatus for wireless communication at a device, comprising a processor; memory coupled with the processor; and instructions stored in the memory and executable by the processor to cause the apparatus to perform the method of one or more of Aspects 44-63.

Aspect 75: A device for wireless communication, comprising a memory and one or more processors coupled to the memory, the one or more processors configured to perform the method of one or more of Aspects 44-63.

Aspect 76: An apparatus for wireless communication, comprising at least one means for performing the method of one or more of Aspects 44-63.

Aspect 77: A non-transitory computer-readable medium storing code for wireless communication, the code comprising instructions executable by a processor to perform the method of one or more of Aspects 44-63.

Aspect 78: A non-transitory computer-readable medium storing a set of instructions for wireless communication, the set of instructions comprising one or more instructions that, when executed by one or more processors of a device, cause the device to perform the method of one or more of Aspects 44-63.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
one or more memories; and
one or more processors, coupled to the one or more memories, configured to:

receive, from a network entity, an indication of multiple transmission occasions for a transmission of a sidelink communication in an unlicensed spectrum; and
transmit, to a second UE, the sidelink communication in a selected transmission occasion of the multiple transmission occasions for the transmission of the sidelink communication in the unlicensed spectrum, wherein the multiple transmission occasions for the transmission of the sidelink communication include a plurality of transmission occasions at at least one of different times or different frequencies, and
wherein the indication indicates:
a time and frequency resource for a first transmission occasion of the multiple transmission occasions,
at least one of a time gap between consecutive transmission occasions of the multiple transmission occasions or a frequency offset between adjacent transmission occasions of the multiple transmission occasions, and
a number of transmission occasions of the multiple transmission occasions.

2. The first UE of claim 1, wherein the one or more processors are further configured to:
perform a listen-before-talk (LBT) procedure for one or more of the multiple transmission occasions, wherein the selected transmission occasion is selected based at least in part on performing the LBT procedure.

3. The first UE of claim 1, wherein the indication includes an indication of multiple transmission occasions for each of an initial transmission of the sidelink communication and one or more retransmission reservations for the sidelink communication.

4. The first UE of claim 1, wherein the multiple transmission occasions for the transmission of the sidelink communication include the plurality of transmission occasions at different times.

5. The first UE of claim 4, wherein the indication indicates the time gap between consecutive transmission occasions of the multiple transmission occasions.

6. The first UE of claim 1, wherein the multiple transmission occasions for the transmission of the sidelink communication include the plurality of transmission occasions at different frequencies.

7. The first UE of claim 6, wherein the indication indicates the frequency offset between adjacent transmission occasions of the multiple transmission occasions.

8. The first UE of claim 1, wherein the indication indicates multiple feedback occasions for sidelink feedback associated with the transmission of the sidelink communication.

9. The first UE of claim 8, wherein the multiple feedback occasions for the sidelink feedback associated with the transmission of the sidelink communication include a plurality of feedback occasions at different times, and the indication indicates a time gap between consecutive feedback occasions of the multiple feedback occasions and a number of feedback occasions of the multiple feedback occasions.

10. The first UE of claim 8, wherein the multiple feedback occasions for the sidelink feedback associated with the transmission of the sidelink communication include a plurality of feedback occasions at different frequencies, and the indication indicates a frequency offset between adjacent feedback occasions of the multiple feedback occasions and a number of feedback occasions of the multiple feedback occasions.

11. The first UE of claim 8, wherein the one or more processors are further configured to:
receive, from the second UE, the sidelink feedback associated with the transmission of the sidelink communication in a feedback occasion of the multiple feedback occasions.

12. The first UE of claim 11, wherein the indication indicates an uplink feedback resource associated with the transmission of the sidelink communication, and wherein the uplink feedback resource is after the multiple feedback occasions for the sidelink feedback associated with the transmission of the sidelink communication.

13. The first UE of claim 12, wherein the one or more processors are further configured to:
transmit, in connection with a non-final transmission of multiple transmissions of the sidelink communication for which resources are allocated in the indication of the multiple transmission occasions for the transmission of the sidelink communication, an indication of the sidelink feedback in the uplink feedback resource only when acknowledgement (ACK) sidelink feedback is received from the second UE; or
transmit, in connection with a final transmission of the multiple transmissions of the sidelink communication for which resources are allocated in the indication of the multiple transmission occasions for the transmission of the sidelink communication, an indication of the sidelink feedback when ACK or negative acknowledgement (NACK) sidelink feedback is received from the second UE.

14. The first UE of claim 8, wherein the one or more processors are further configured to:
start a sidelink inactivity timer in connection with transmitting the sidelink communication to the second UE, wherein the multiple feedback occasions are included within a time duration of the sidelink inactivity timer.

15. The first UE of claim 1, wherein the indication includes an indication of multiple transmission occasions and an indication of multiple feedback occasions for each of an initial transmission of the sidelink communication and one or more retransmission reservations for the sidelink communication.

16. The first UE of claim 1, wherein the indication includes an indication of a first set of transmission occasions for a first transmission of a sidelink communication in the unlicensed spectrum and an indication of a second set of transmission occasions for a second transmission of the sidelink communication in the unlicensed spectrum,
wherein the one or more processors, to transmit the sidelink communication, are configured to transmit the first transmission of the sidelink communication in a first selected transmission occasion of the first set of transmission occasions, and
wherein the one or more processors are further configured to:
receive, from the second UE, negative acknowledgement (NACK) sidelink feedback associated with the first transmission of the sidelink communication;
start a sidelink hybrid automatic repeat request (HARQ) retransmission timer in connection with receiving the NACK sidelink feedback from the second UE, wherein a time duration of the sidelink HARQ retransmission timer includes the second set of transmission occasions for the second transmission of the sidelink communication; and retransmit the sidelink communication to the second UE in a second selected transmission occasion of the second set of transmission occasions.

17. The first UE of claim 1, wherein the indication is included in a radio resource control (RRC) communication.

18. The first UE of claim 1, wherein the indication is included in a medium access control (MAC) control element (MAC-CE).

19. The first UE of claim 1, wherein the indication is included in downlink control information (DCI).

20. A first user equipment (UE) for wireless communication, comprising:
one or more memories; and
one or more processors, coupled to the one or more memories, configured to:
receive, from a network entity, an indication of multiple feedback occasions for transmitting sidelink feedback associated with a transmission of a sidelink communication in an unlicensed spectrum;
receive, from a second UE, the transmission of the sidelink communication; and
transmit, to the second UE in a selected feedback occasion of the multiple feedback occasions, the sidelink feedback associated with the transmission of the sidelink communication in the unlicensed spectrum, and
wherein at least one of:
the multiple feedback occasions for the sidelink feedback associated with the transmission of the sidelink communication include a plurality of feedback occasions at different times, and the indication indicates a time gap between consecutive feedback occasions of the multiple feedback occasions and a number of feedback occasions of the multiple feedback occasions, or
the multiple feedback occasions for the sidelink feedback associated with the transmission of the sidelink communication include a plurality of feedback occasions at different frequencies, and the indication indicates a frequency offset between adjacent feedback occasions of the multiple feedback occasions and the number of feedback occasions of the multiple feedback occasions.

21. The first UE of claim 20, wherein the multiple feedback occasions for the sidelink feedback associated with the transmission of the sidelink communication include the plurality of feedback occasions at different times, and the indication indicates the time gap between consecutive feedback occasions of the multiple feedback occasions and the number of feedback occasions of the multiple feedback occasions.

22. The first UE of claim 20, wherein the multiple feedback occasions for the sidelink feedback associated with the transmission of the sidelink communication include the plurality of feedback occasions at different frequencies, and the indication indicates the frequency offset between adjacent feedback occasions of the multiple feedback occasions and the number of feedback occasions of the multiple feedback occasions.

23. The first UE of claim 20, wherein the one or more processors are further configured to:
perform a listen-before-talk (LBT) procedure for one or more of the multiple feedback occasions, wherein the selected feedback occasion is selected based at least in part on performing the LBT procedure.

24. The first UE of claim 20, wherein the one or more processors, to receive the indication of the multiple feedback occasions, are configured to:
receive the indication of the multiple feedback occasions from the second UE, wherein the indication is included in a radio resource control (RRC) communication, a medium access control (MAC) control element (MAC-CE), or sidelink control information (SCI).

25. The first UE of claim 20, wherein the one or more processors, to receive the indication of the multiple feedback occasions, are configured to:
receive the indication of the multiple feedback occasions from a network entity, wherein the indication is included in a radio resource control (RRC) communication or a medium access control (MAC) control element (MAC-CE).

26. A method of wireless communication performed by a first user equipment (UE), comprising:
receiving, from a network entity, an indication of multiple feedback occasions for transmitting sidelink feedback associated with a transmission of a sidelink communication in an unlicensed spectrum;
receiving, from a second UE, the transmission of the sidelink communication; and
transmitting, to the second UE in a selected feedback occasion of the multiple feedback occasions, the sidelink feedback associated with the transmission of the sidelink communication in the unlicensed spectrum, and
wherein at least one of:
the multiple feedback occasions for the sidelink feedback associated with the transmission of the sidelink communication include a plurality of feedback occasions at different times, and the indication indicates a time gap between consecutive feedback occasions of the multiple feedback occasions and a number of feedback occasions of the multiple feedback occasions, or
the multiple feedback occasions for the sidelink feedback associated with the transmission of the sidelink communication include a plurality of feedback occasions at different frequencies, and the indication indicates a frequency offset between adjacent feedback occasions of the multiple feedback occasions and the number of feedback occasions of the multiple feedback occasions.

27. The method of claim 26, wherein the multiple feedback occasions for the sidelink feedback associated with the transmission of the sidelink communication include the plurality of feedback occasions at different times, and the indication indicates the time gap between consecutive feedback occasions of the multiple feedback occasions and the number of feedback occasions of the multiple feedback occasions.

28. A network entity for wireless communication, comprising:
one or more memories; and
one or more processors, coupled to the one or more memories, configured to:
transmit an indication of multiple feedback occasions for transmitting sidelink feedback associated with a transmission of a sidelink communication in an unlicensed spectrum, wherein at least one of:
the multiple feedback occasions for the sidelink feedback associated with the transmission of the sidelink communication include a plurality of feedback occasions at different times, and the indication indicates a time gap between consecutive feedback occasions of the multiple feedback occasions and a number of feedback occasions of the multiple feedback occasions, or the multiple feedback occasions for the sidelink feedback associated with the transmission of the sidelink communication include a plurality of feedback occasions at different frequencies, and the indication indicates a frequency offset between adjacent feedback occasions of the multiple feedback occasions and the number of feedback occasions of the multiple feedback occasions; and receive feedback associated with the transmission of the sidelink communication.

29. The network entity of claim 28, wherein the multiple feedback occasions for the sidelink feedback associated with the transmission of the sidelink communication include the plurality of feedback occasions at different times, and the indication indicates the time gap between consecutive feedback occasions of the multiple feedback occasions and the number of feedback occasions of the multiple feedback occasions.

30. The network entity of claim 28, wherein the multiple feedback occasions for the sidelink feedback associated with the transmission of the sidelink communication include the plurality of feedback occasions at different frequencies, and the indication indicates the frequency offset between adjacent feedback occasions of the multiple feedback occasions and the number of feedback occasions of the multiple feedback occasions.

* * * * *